| (12) | United States Patent | (10) Patent No.: | US 11,055,732 B2 |
|---|---|---|---|
| | Sun | (45) Date of Patent: | Jul. 6, 2021 |

(54) DAY-AHEAD JOINT GENERATION SCHEDULING AND BIDDING OPTIMIZATION FOR POWER PLANTS

(71) Applicant: Mitsubishi Electric Research Laboratories, Inc., Cambridge, MA (US)

(72) Inventor: Hongbo Sun, Lexington, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 209 days.

(21) Appl. No.: 16/128,939

(22) Filed: Sep. 12, 2018

(65) Prior Publication Data

US 2020/0082422 A1 Mar. 12, 2020

(51) Int. Cl.
 *G06Q 30/02* (2012.01)
 *G06Q 10/06* (2012.01)
 (Continued)

(52) U.S. Cl.
 CPC ......... *G06Q 30/0206* (2013.01); *G06F 17/11* (2013.01); *G06N 3/04* (2013.01);
 (Continued)

(58) Field of Classification Search
 CPC .......... G06Q 30/0206; G06Q 10/0631; G06Q 30/08; G06Q 50/06; G06F 17/11; G06N 3/04; G06N 7/08
 See application file for complete search history.

(56) References Cited

U.S. PATENT DOCUMENTS

| 5,974,403 A | * | 10/1999 | Takriti | .................. | G06Q 50/06 |
|---|---|---|---|---|---|
| | | | | | 705/412 |
| 2003/0182250 A1 | * | 9/2003 | Shihidehpour | ........ | G06Q 10/04 |
| | | | | | 706/21 |

(Continued)

OTHER PUBLICATIONS

W. Ongsakul et al. "Economic Dispatch with Linear Decreasing and Staircase Incremental Cost Functions by Micro Genetic Algorithms", May-Jun. 1999, Neotec Technical Journal vol. 1 No. 2 pages 62-69 (Year: 1999) (Year: 1999).*

(Continued)

*Primary Examiner* — Mehmet Yesildag
*Assistant Examiner* — Ayanna Minor
(74) *Attorney, Agent, or Firm* — Gennadiy Vinokur; Hironori Tsukamoto

(57) ABSTRACT

Systems and methods to control activation of a generation unit. Compute an offer amount, representative of a value at which power is available to be supplied by a generation unit for a current or each subsequent upcoming time period in a time window. Construct energy supply curves using a set of points for each time period in the time window, to obtain associated amounts of power to supply with corresponding prices per each time period. Use a gradual decreasing price staircase approach to iteratively determine multiple offer amount scenarios. Submit the multiple offer amount scenarios along with corresponding values representative of available quantities of power to an operator computer that controls a market-based resource allocation system. Receive back a submitted supply value for the current or upcoming time period. Compare the submitted supply value to the submitted offer amount, and activate or deactivate the generation unit based on the comparison.

18 Claims, 15 Drawing Sheets

(51) Int. Cl.
 H02J 3/46  (2006.01)
 G06Q 50/06  (2012.01)
 G06F 17/11  (2006.01)
 G06N 3/04  (2006.01)
 G06N 7/08  (2006.01)
 G06Q 30/08  (2012.01)

(52) U.S. Cl.
 CPC ........... *G06N 7/08* (2013.01); *G06Q 10/0631* (2013.01); *G06Q 30/08* (2013.01); *H02J 3/466* (2020.01); *G06Q 50/06* (2013.01)

(56) References Cited

U.S. PATENT DOCUMENTS

| | | |
|---|---|---|
| 2004/0215545 A1 | 10/2004 | Murakami et al. |
| 2012/0278220 A1 | 11/2012 | Chassin et al. |
| 2012/0278221 A1* | 11/2012 | Fuller .................. G06Q 40/00 705/37 |
| 2014/0081704 A1* | 3/2014 | Strelec .................. G06Q 40/04 705/7.31 |
| 2015/0221030 A1 | 8/2015 | Aganagic et al. |
| 2016/0261115 A1* | 9/2016 | Asati ....................... H02J 13/00 |
| 2017/0200229 A1 | 7/2017 | Price et al. |

OTHER PUBLICATIONS

Zixu Liu., "Integrated Demand and Supply Side Management and Smart Pricing for Electricity Market." A thesis submitted to the University of Manchester for the degree of Doctor of Philosophy in the Faculty of Science and Engineering, School of Computer Science. 2017.

* cited by examiner

DAY-AHEAD JOINT GENERATION SCHEDULING AND BIDDING OPTIMIZATION FOR POWER PLANTS

FIELD

The present disclosure relates generally to electric power systems, and more particularly to joint generation scheduling and bidding optimization for power plants.

BACKGROUND

In a competitive day-ahead energy market, energy services are primarily traded through double-auctions for all time-intervals, for example 30 minutes of next day. Power plants as power producers submit generation supply offers for individual or a portfolio of generators at each interval of the next day, while power consumption aggreagators as power consumers submit power demand bids for the next day for same time-intervals. The power producers have to determine their offers with limited available information, usually only including historical total buy and sell amounts, market clearing prices (MCPs) and market clearing quantities (MCQs) for the entire system, but none of competitors' or consumers' past or current offering or bidding.

The power producer's conventional supply offer is provided in pairs of price and quantity, i.e. bid-points for each time-interval in up to a certain number of steps that are arranged according to increasing prices. The offer curves can be either stepwise or piecewise. The maximum number of steps to be allowed is dependent on the Independent System Operators (ISOs), but this number is usually larger, for examples 20 steps or offer bids. However power producer's conventional offers or offer strategies fail to provide multiple bids. With the power producer's conventional offers or offer strategies failing to provide more steps or bids, translates into the power producers missing the advantages in providing more steps. For example, with an increase in bidding steps results in flexibility for profit maximization, the more flexibility a power plant can have to compromise its profits and risks to gain competition advantages. At least one reason the power producer's offers and offering strategies fail to provide more bids, is because with the more steps or bids, the more computation time is required due to the increased complexity.

Based on supply offers and demand bids, the ISO determines MCPs and MCQs for each 30 minute interval and the power quantities awarded to each power plant by solving a security-based unit commitment and dispatch problem. After the auction closes, each power plant aggregates the power awards as its system demand, and performs unit commitment and dispatch to fulfill the market obligations at the minimum operation cost.

In this conventional process, how well a power plant supply profits depends on how good the power plants offering strategies have been structured. However, power plant conventional offering strategies are not well developed, in view of the MCP volatilities, and often fail due to not developing effective and computationally efficient offering strategies with good risk management.

There are many reasons why power plant's have not further developed their conventional offering strategies, for example, there are many challenging issues in developing such offering strategies. The first problem with today's power producer's conventional offers or offer strategies, can be that power producers compete against each other to provide the energy demanded by power consumers, and only the bidded quantity of power, which price is equal or less than, the market clearing price will be awarded by the ISO. However, power producers cannot precisely predict the market clearing price and/or the possible variations due to the underlying uncertainties inherent in todays energy market, as well as due to other factors such as the uncertain demand for electricity, tactics used by competitors, outages of generators and transmission constraints.

A second problem with today's power producer's conventional offers or offer strategies, can be that the power producer can only maximize net profits when the offered price is compatible to their competitors, such that the power producer's offer needs to be accepted by the ISO, and that price has to be sufficiently higher than power producer's marginal operation cost so as to obtain net profits through energy trading. Typically, the conventional power producer's offers or offer strategies fail due to unknown competitors' behaviors, such that the conventional power producer's pricing strategies fails to incorporate many factors that are conventionally considered to be made by compromising contradictory objectives, for example, profit maximization, and risk minimization strategically.

A third problem with today's power producer's conventional offers or offer strategies, can be failing to consider in the offering decisions by the power producers their generation scheduling, and the generator characteristics. In part, how power producers production capabilities will impact awarded bids in the future, if the risks associated with production are not fully considered prior to making the bids or incorporated into bids related to providing energy in the future. In other words, conventional power producing offers and offer strategies typically fail due to trying to couple the offering with scheduling, simply because such a task makes the optimization problem more difficult.

Finally, the four problem with today's power producer's conventional offers or offer strategies, among many problems, can be the power plant's failing to consider supply offers in multiple steps strategically or at all. The power producer's conventional offers or offering strategies fail to make full use of the maximum number of offering steps that ISO will allowed. As a result, the can increase its offers' acceptance probability and thus increase its expected net profits. However the computation efforts are also increased with the total number of steps, therefore how to deal with the step coupling for offering is also critical to garnter power producer scheduling in a timely manner. All of these issues have made the power producer bidding and scheduling a very challenging task in a competitive market.

Efforts have been made to address power plant generation scheduling under the market environment. For example, US 2010/0114387A1 proposed electric power grid control using a market-based resource allocation system. A plurality of requests for electricity are received from a plurality of end-use consumers. The requests indicate a requested quantity of electricity and a consumer-requested index value indicative of a maximum price a respective end-use consumer will pay for the requested quantity of electricity. A plurality of offers for supplying electricity are received from a plurality of resource suppliers. The offers indicate an offered quantity of electricity and a supplier-requested index value indicative of a minimum price for which a respective supplier will produce the offered quantity of electricity. A dispatched index value is computed at which electricity is to be supplied based at least in part on the consumer-requested index values and the supplier-requested index values. Further, U.S. Pat. No. 7,274,975 B2 proposed methods and systems for optimizing the control of energy supply and demand. An energy control unit includes one or more algorithms for scheduling the control of energy consumption devices on the basis of variables relating to forecast energy supply and demand. Devices for which energy consumption can be scheduled or deferred are activated during periods of cheapest energy usage. Battery storage and alternative energy sources are activated to sell energy to the power grid during periods that are determined to correspond to favorable cost conditions.

However and unfortunately, all of the above priort art fail to address the conventional major challenges regarding the determination of price scenarios and associated acceptance probabilities to represent price uncertainty and their impacts on offering strategies, and on an efficient computational solution for the problem of bidding and scheduling coupling that takes into account the monotonically increasing requirement of supply offer curves that allowed to have large number of steps, and smooth transition between offering steps at consecutive scheduling intervals when ISO awards different quantity steps for two consecutive intervals to the power producer.

Accordingly, there is a need for power plants to further develop offering strategies over the present non-developed conventional offering strategies or approaches, simply for the reason that today's power plants need to maximize profits with manageable risks and to obtain competitive advantages in a computationally efficient way, in order to address the increasing competitive power supplying markets, among other things.

SUMMARY

The present disclosure relates to electric power systems, and in particular to joint generation scheduling and supply bidding optimization for power plants.

Some embodiments are based on recognition of how to determine an optimal supply offer curve with large number of steps for each scheduling interval of the next day, to achieve the best balance between pursuing profit and risk management with uncertain prices while a feasible generation scheduling can be found for any reasonable combination of bids chosen from offer curves awarded by the independent system operators.

In addressing the price scenario determination, at least one challenge for joint scheduling and bidding optimization is dealing with uncertain market clearing energy prices, and competitor and customer behaviors. At least one realization of the present disclosure to handle this challenge is by modeling the uncertain prices with a set of sample price scenarios with determined acceptance probability. In this patent application, we first use a machine learning based method to predict the MCPs and its deviation distribution for each time-interval of next day based on previous day and previous week same day's MCPs, MCQs, total sell and buy amounts, predicted day's inter-regional tie flows and capacities, and predicted day's regional temperatures. The machine learning approach includes multiple-regression analysis or an artificial neural network (ANN) approach.

Based upon the above realizations, embodiments of the present disclosure include a first step that predicts a market clearing price (MCP) and an associated deviation distribution for each scheduling interval of the next day. The MCP and the associated deviation distribution is based on historical MCPs and MCQs, historical and predicted regional temperatures and available tie capacities using machine learning approach. Compared with conventional approach used by power plants that only based on historical trading data or additional temperatures, this disclosure considers the tie flows and capacities to implicitly represent the network constraints within or between regions, therefore the MCPs can be estimated by region and considered of network constraints. In addition, compared with conventional approach used by ISOs that based on detailed estimations of loads and generations for individual power consumers and producers, this disclosure only needs historical system-wide trading summaries and inter-regional tie flows and capacities. The data requirements for the disclosed approach are limited, and there is no need for disclosing trading details for individual market player.

A next step of the method can include, determining a set of market clearing price scenarios up to the maximal number of offering steps allowed by ISOs and associated acceptance probability distribution for each scheduling interval based on the predicted market clearing price and its probability distribution of that interval. As noted above, the scheduling intervals are for the next day at 30 minute periods for each interval. Using this approach, the stochastic nature of MCPs are relatively completely represented by a fixed but reasonable larger number of sampling scenarios, and explicit modeling of MCPs' stochasticity is avoided. In addition, each scenario is associated with an index to represent its chance to be accepted by the ISOs, and is weighted by this acceptance probability when determining the expected revenues for the price scenario. Compared with conventional approach to compute expected revenue with MCP distribution probability, this approach differentiates the difference between the acceptance chances for a pair of MCPs with same distribution probability.

Upon completing the set of market clearing price scenarios and associated acceptance probability distribution for each scheduling interval, a next step can include a two-objective optimal model for generation scheduling and bidding for scheduling intervals of the next day. The two-objective optimal model can be formulated to maximize both the expected profit gain for generation production and the expected profit gain at risk objectives while satisfying the offer curve logistics for each scheduling interval, step transitions between consecutive scheduling intervals, and generation capacity and ramping rate constraints.

A next step can include converting the two-objective optimal approach or model into a single objective problem by maximizing the overall satisfying degree of two objectives. Wherein, the complexity introduced by the monotonically increasing requirement of supply offer curve steps of each scheduling interval can be simplified by using a gradual decreasing price staircase approach to solve the converted optimal problem. Wherein the problem can be first solved by setting the price of all offer curve steps of each scheduling interval using the highest price scenario for all price scenarios of the interval. Then, gradually reducing the prices for steps, using a price scenario chosen from remaining price scenarios until no new better solution is found.

The present disclosure in regard to "price" does not demand information (loads information), such that the present disclosure uses tie-line flow information, forward tie-line flow and backward tie-line flow and capacities which is include in the calculation, but does not affect results unless there is crowd-full use at that specific time. Conventional methods use a unified regional price, whereas the present disclosure calculates its own regional price.

The present disclosure in regard to "bidding" has no need for demand information. Wherein the present disclosure creates multiple steps including constraint offering curve logistics as constraints, whereas conventional approaches use an ordered solution calculation approach based on a historical offer step chart. Further, the present disclosure smooths the price step transition between the different time steps.

The present disclosure aspects recite a series of specific concrete and unconventional operation performed in a specialized setting of power grid management and control using distributed, transactive computing hardware associated with the generation unit(s) in communication with an energy operator computer that controls a market-based resource allocation system. The present disclosure improves the technology fields of electrical power grid management and electricity generator control using distributed transactive computing hardware associated with the electrical generator units.

According to an embodiment of the disclosure, a system to control activation of a generation unit including a memory and a hardware processor. The hardware processor is configured to compute an offer amount representative of a value at which power is available to be supplied by a generation unit for a current or each subsequent upcoming time period in a time window. Such that the computation of the offer amount is based on multiple factors for each time period. Wherein some of the multiple factors include submitted supply value information from an energy futures market and a predicted market clearing value submission (MCVS) and associated distribution probability. Construct energy supply curves using a set of points for each time period in the time window, to obtain associated amounts of power to supply with corresponding prices per each time period. Wherein the set of points per each time period are calculated from determined corresponding scheduling decision variables associated with the generation unit for per each time period in the time window. Use a gradual decreasing price staircase approach to iteratively determine multiple offer amount scenarios during the current or the subsequent upcoming time period. Submit the multiple offer amount scenarios along with corresponding values representative of quantities of power that are available to be supplied by the generation unit during the current or the subsequent upcoming time period to an energy operator computer that controls a market-based resource allocation system. Receive from the energy operator computer a submitted supply value for the current or upcoming time period, the submitted supply value being based at least in part on the submitted multiple offer amount scenarios. Compare the submitted supply value to the submitted offer amount. Finally, activate or deactivate the generation unit based on the comparison.

According to an embodiment of the disclosure, a method to control activation of a generation unit. The method including computing an offer amount representative of a value at which power is available to be supplied by a generation unit for a current or each subsequent upcoming time period in a time window. Such that the computation of the offer amount is based on multiple factors for each time period. Wherein some of the multiple factors include submitted supply value information from an energy futures market and a predicted market clearing value submission (MCVS) and associated distribution probability. Constructing energy supply curves using a set of points for each time period in the time window, to obtain associated amounts of power to supply with corresponding prices per each time period. Wherein the set of points per each time period are calculated from a determined corresponding scheduling decision variables associated with the generation unit for per each time period in the time window. Using a gradual decreasing price staircase approach to iteratively determine multiple offer amount scenarios during the current or the subsequent upcoming time period. Submitting the multiple offer amount scenarios along with corresponding values representative of quantities of power that are available to be supplied by the generation unit during the current or the subsequent upcoming time period to an energy operator computer that controls a market-based resource allocation system. Receiving from the energy operator computer a submitted supply value for the current or upcoming time period, the submitted supply value being based at least in part on the submitted multiple offer amount scenarios; comparing the submitted supply value to the submitted offer amount. Activating or deactivating the generation unit based on the comparison. Wherein at least some steps of the method are performed by a processor connected to memory.

According to an embodiment of the disclosure, a non-transitory computer readable storage medium embodied thereon a program executable by a processor for performing a method. The method including computing an offer amount representative of a value at which power is available to be supplied by a generation unit for a current or each subsequent upcoming time period in a time window. Such that the computation of the offer amount is based on multiple factors for each time period. Wherein some of the multiple factors include submitted supply value information from an energy futures market and a predicted market clearing value submission (MCVS) and associated distribution probability. Wherein the submitted supply value information includes previous cleared market prices associated with the energy futures market that is stored data in the memory, data received via the transceiver, or both. Wherein the energy futures market is a day-ahead energy market. Constructing energy supply curves using a set of points for each time period in the time window, to obtain associated amounts of power to supply with corresponding prices per each time period. Wherein the set of points per each time period are calculated from determined corresponding scheduling decision variables associated with the generation unit for per each time period in the time window. Using a gradual decreasing price staircase approach to iteratively determine multiple offer amount scenarios during the current or the subsequent upcoming time period. Submitting the multiple offer amount scenarios along with corresponding values representative of quantities of power that are available to be supplied by the generation unit during the current or the subsequent upcoming time period to an energy operator computer that controls a market-based resource allocation system. Receiving from the energy operator computer a submitted supply value for the current or upcoming time period, the submitted supply value being based at least in part on the submitted multiple offer amount scenarios. Comparing the submitted supply value to the submitted offer amount. Activating or deactivating the generation unit based on the comparison. Wherein at least some steps of the method are performed by a processor connected to memory.

BRIEF DESCRIPTION OF THE DRAWINGS

The present disclosure is further described in the detailed description which follows, in reference to the noted plurality of drawings by way of non-limiting examples of exemplary embodiments of the present disclosure, in which like reference numerals represent similar parts throughout the several views of the drawings. The drawings shown are not necessarily to scale, with emphasis instead generally being placed upon illustrating the principles of the presently disclosed embodiments.

Figure 1A:
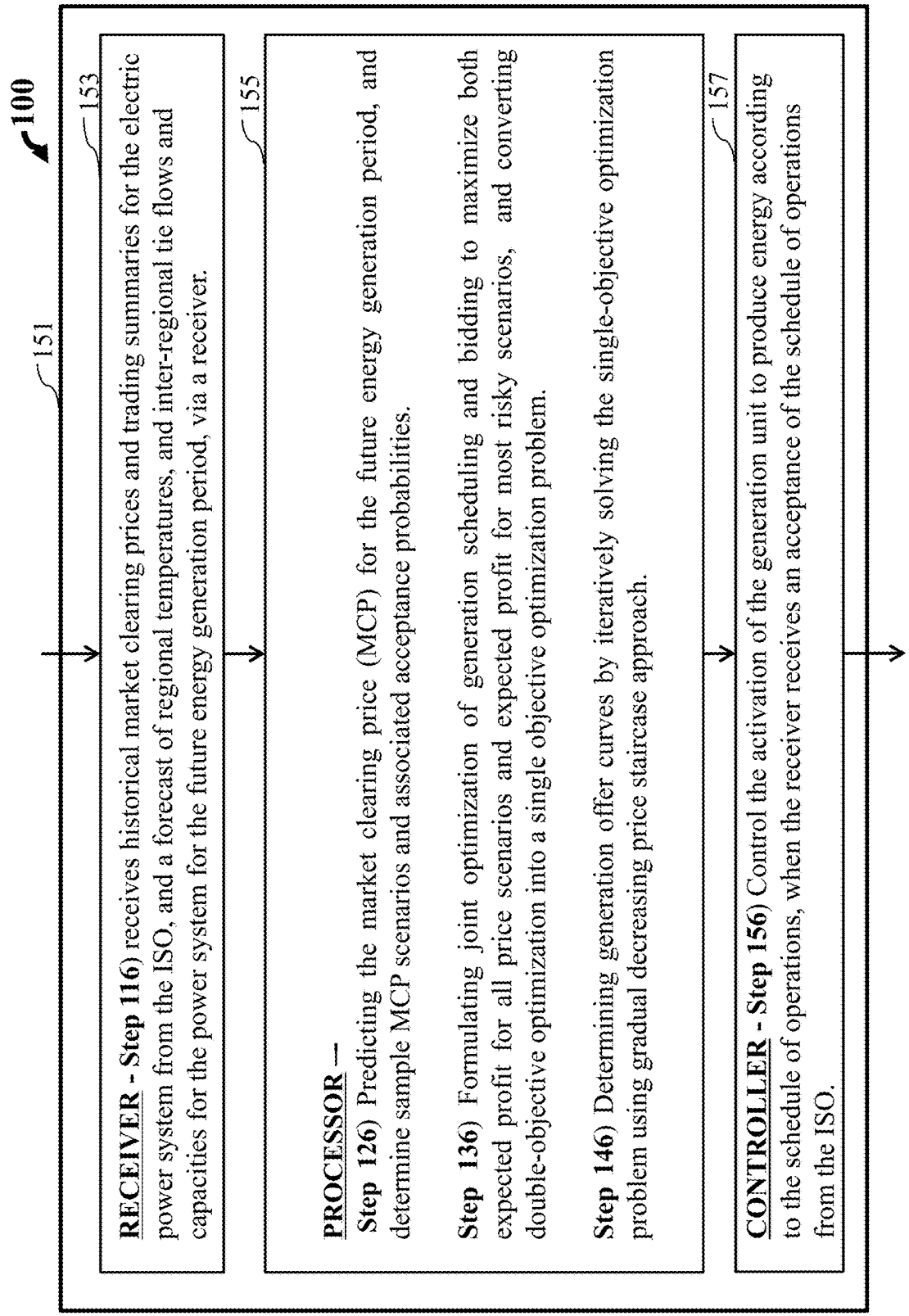
FIG. 1A is a schematic block diagram of some steps to control activation of a generation unit, according to some embodiments of the present disclosure.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

Overview

The present disclosure relates to electric power systems, and in particular to joint generation scheduling and supply bidding optimization for power plants.

Some embodiments of the present disclosure include methods for day-ahead generation scheduling and bidding optimization of power plants. The methods first predict a market clearing price and associated probability distribution for each scheduling interval of the next day. Which is based on historical MCPs and market clearing power quantities, historical and predicted regional temperatures, historical and predicted bi-directional tie flows and capacities using machine learning approach. A set of market clearing price scenarios and associated acceptance probability distribution are then determined for each scheduling interval based on the predicted market clearing price and its probability distribution of that interval. Further, a two-objective optimal approach or model is used for generation scheduling and bidding for scheduling intervals of the next day. Which is formulated to maximize both the expected profit gain for generation production and the expected profit gain at risk objectives while satisfying the offer curve logistics for each scheduling interval, scenario transition constraints between scheduling intervals for facilitating ISOs choosing different steps among scheduling intervals, generation capacity and ramping rate constraints, and generator minimum on/off times and duration constraints. The next step is to convert formulated two-objective optimization problem into a single-objective optimization problem by maximizing the overall satisfying degree of two objectives. The nonlinearity introduced by the coupling of MCPs and offering power quantities, and the complexity introduced by the monotonically increasing requirement of supply offer curve steps can be simplified by using a gradual decreasing price staircase approach to solve the converted optimal problem. The problem can be first solved by setting the prices of all offer curve steps of each scheduling interval using the highest price scenario for all price scenarios of the interval, and the step corresponding to the highest price is matched with this price scenario. Then, reducing the price scenario one level down for all un-matched steps chosen from the remaining price scenarios and run new solutions for the problem until a set of steps is found to be matched with this price level with feasible solutions. This price reducing process iterates for all remaining price scenario until no new better solution is founded.

FIG. 1A is a schematic block diagram of some steps to control activation of a generation unit 150 of a power plant 110, according to some embodiments of the present disclosure. The activation controlling of a generation unit 150 of a power plant is for generating and providing electricity to an electric power system operated by an independent system operator (ISO). Wherein multiple power plants provide supply the electricity to the electric power system and multiple power consumers demand the electricity from the electric power system. The power plant includes a set of generators. The activation control system of the power plant can include a computer 151 or like device, or multiple computers. It is contemplated the computer(s) can be located at different locations, and in communication with each other. Further, other components of the computer may be located at other locations, but are connected via a network, or some like arrangement.

Step 116 of FIG. 1A, includes receiving, via a receiver 153, a set of historical MCPs and trading summaries for the electric power system from the ISO, and a forecast of regional temperatures, and inter-regional tie flows and capacities for the power system for the future energy generation period.

Step 126 of FIG. 1A, includes a processor 155 in communication with the receiver 153, is configured to predict the market clearing price (MCP) for the future energy generation period, and determine sample MCP scenarios and associated acceptance probabilities.

Step 136 of FIG. 1A, is processed using the processor 155 to formulate joint optimization of generation scheduling and bidding to maximize both expected profit for all price scenarios and expected profit for most risky scenarios, and converting double-objective optimization into a single objective optimization problem. It is contemplated that multiple processors may be used depending upon the application.

Step 146 of FIG. 1A, is processed using the processor 155 to determine a generation offer curves by iteratively solving the single-objective optimization problem using gradual decreasing price staircase approach.

Step 156 of FIG. 1A, includes a controller 157 that can be used to control the activation of a generation unit to produce energy according to the schedule of operations, when the receiver receives an acceptance of the schedule of operations from the ISO Again, it is contemplated that multiple controllers can be used depending upon the application, along that the multiple controllers can be differently located.

Figure 1B:
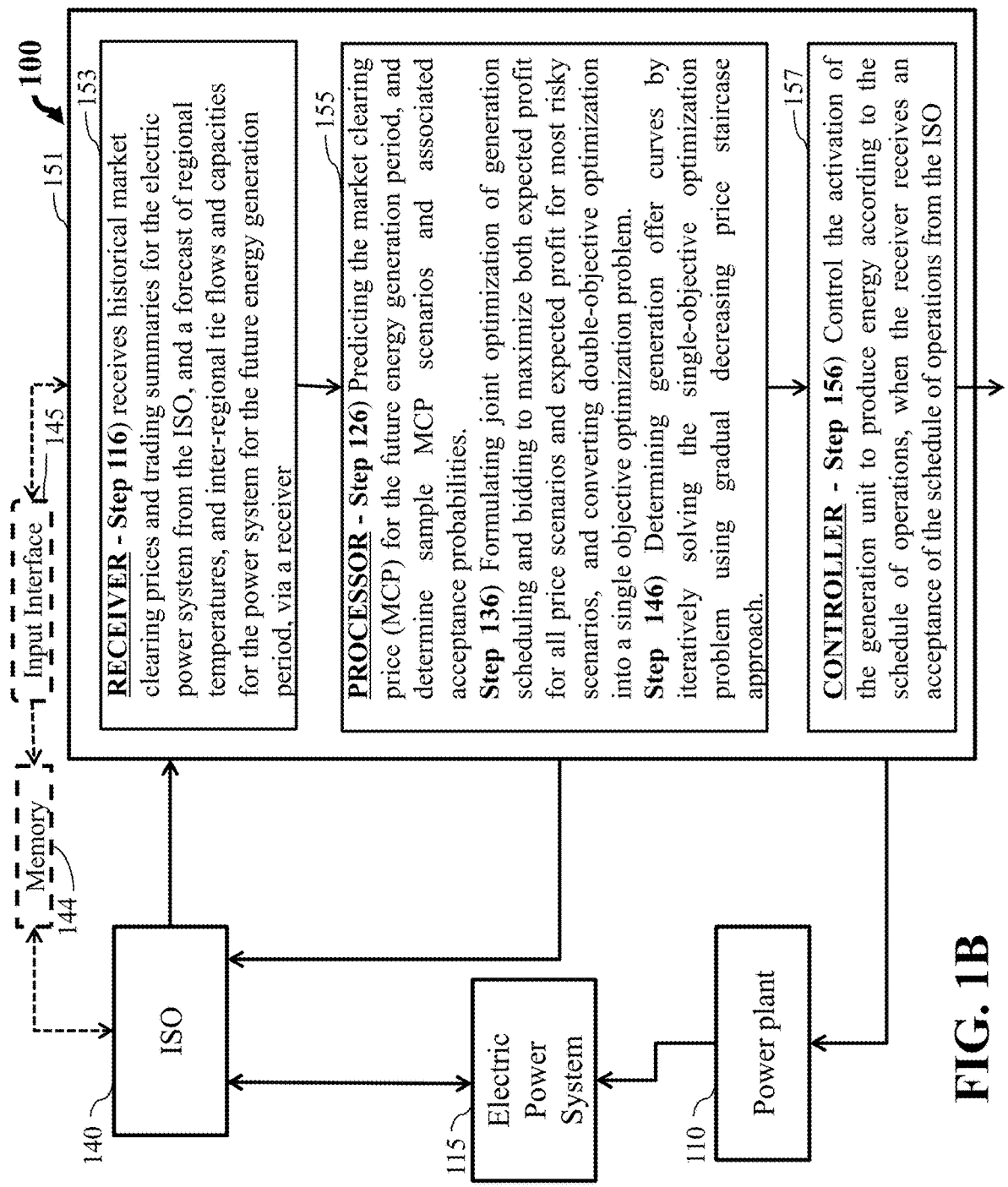
FIG. 1B is a schematic illustrating components and steps of controlling activation of a generation unit, according to some embodiments of the present disclosure.

FIG. 1B is a schematic illustrating components and steps of controlling activation of a generation unit, according to some embodiments of the present disclosure.

The generation unit 150 in a power plant 110 generates and provides electricity to the electric power system 115 that can be operated by an independent system operator (ISO) 140. The activation control system of a generation unit 100 can include a computer 151 or like device, or multiple computers.

Still referring to FIG. 1B, the receiver 153 of the generator activation control system receives a set of historical MCPs and trading summaries for the electric power system from the ISO, and a forecast of regional temperatures, and inter-regional tie flows and capacities (step 116).

The processor 155 then, in communication with the receiver 153, predicts the market clearing price (MCP) for the future energy generation period, and determine sample MCP scenarios and associated acceptance probabilities (step 126), and formulate joint optimization of generation scheduling and bidding to maximize both expected profit for all price scenarios and expected profit for most risky scenarios, and converting double-objective optimization into a single objective optimization problem (step 136). After the converted optimization problem is obtained, the processor 155 determines a set of generation offer curves by iteratively solving the single-objective optimization problem using gradual decreasing price staircase approach (step 146).

Still referring to FIG. 1B, the activation control system 100 of the generation unit 150 of the power plant 110 sends the determined schedule of operations of the generation unit for each time step of the future energy generation period to the ISO 140, and the controller 157 controls the generation unit 150 to produce energy according to the schedule of operations, when the approval for the determined schedule is received via the receiver 153 from the ISO 140 (step 156).

Optionally, the activation control system of the generation unit 100 can store the system energy and price data in a computer readable memory 144, wherein the computer readable memory is in communication with the processor 155 and controller 157. Further, it is possible an input interface 145 can be in communication with the memory 144 and the processor 155 and controller 157. For example, a user via a user interface of the input interface 145 may input predicted predetermined conditions, for example, the planned inter-regional tie flows. It is contemplated the receiver, processor and controller could be a single computer system or multiple computer systems located at different locations depending on the specific application(s).

Figure 1C:
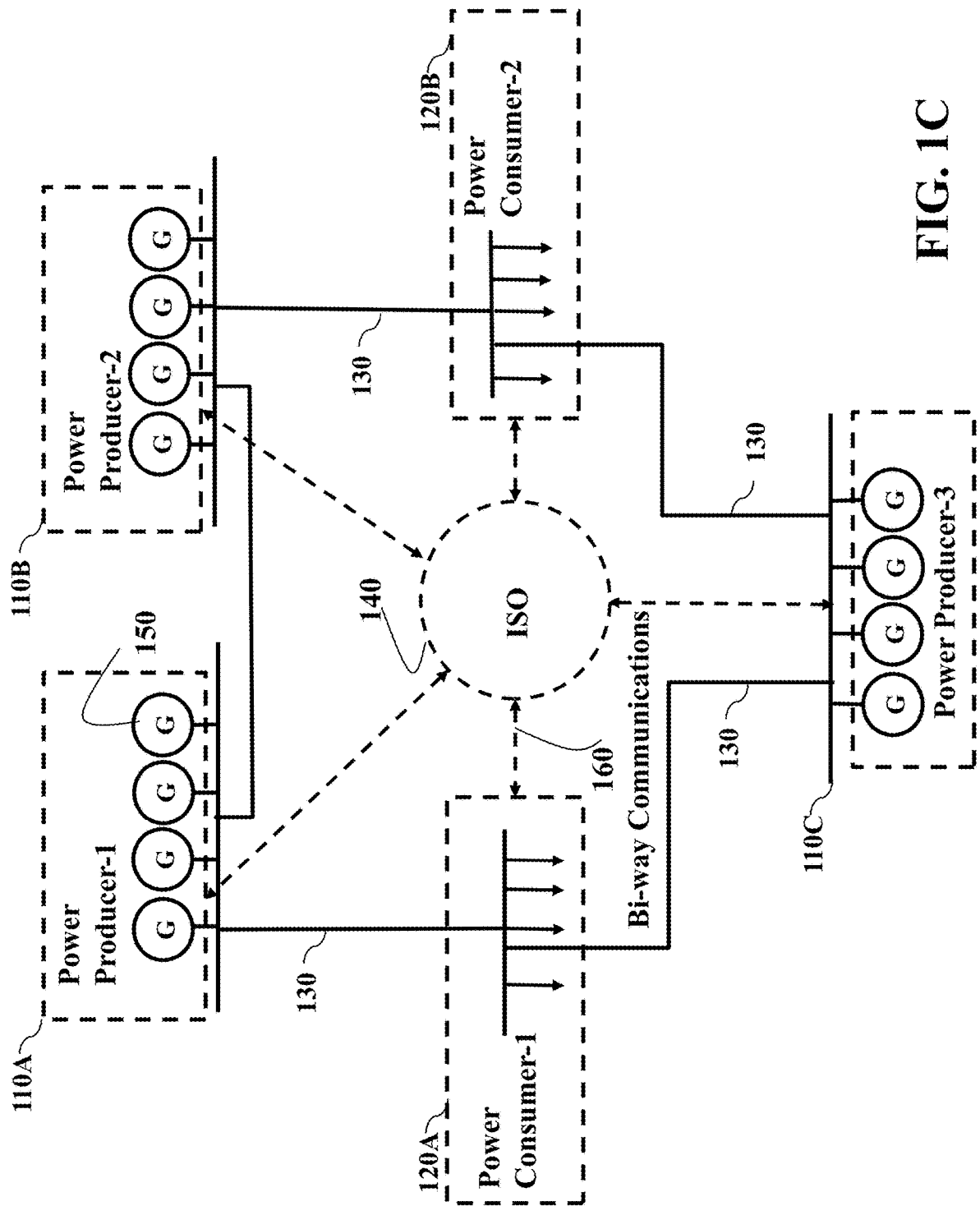
FIG. 1C is a schematic illustrating a power plant with a power system regulated by an independent system operator (ISO), according to some embodiments of the present disclosure.

FIG. 1C is a schematic illustrating a power plant, i.e. power producer connected with an electric power system regulated by an independent system operator (ISO), according to some embodiments of the present disclosure. In particular, FIG. 1C shows an electric power system 115 under an electricity market environment. The electric power system can include a set of power plants that produce powers for the system, called power producers, 110A, 110B and 110C. Each power producer 110A, 110B and 110C may have multiple generation units, or called generators, 150. The electric power system 115 can also include a set of end-users, called power consumers, 120A, 120B to consume the powers provided by the power producers 110A, 110B and 110C through the network connected by transmission lines, 130. An independent system operator (ISO), 140 is responsible for the coordination between producers and consumers to maintain stable operation of the electric power system 115. A communication network may be used for exchanging information between the ISO and the producers, or the consumers through communication links, 160. In FIG. 1C, as an example, there are 3 power producers 110A, 110B and 110C, 2 power consumers 120A, 120B, and 5 transmission lines 130. Each producer 110A, 110B and 110C can have 4 generators. The generation scheduling of power producers can be determined by the ISO in a centralized manner or by the power producer itself in a distributed way. An aspect of the present disclosure focuses on optimal self-scheduling of a power plant along with determination of optimal offering curves simultaneously.

Deregulated electricity markets facilitate competition among power producers, which is ultimately expected to reduce the cost of electricity for the end-users. In a competitive electricity market, the aim of a power producer is to maximize its financial benefits with manageable risks by self-scheduling of their generators in both the day-ahead and real-time energy markets. The revenue for a power producer is determined as a product of market clearing prices (MCPs) and corresponding awarded supply quantities. The MCPs are commonly locational marginal prices that depends on the load demand forecast, network constraints, power producers' offers and power consumers' bids for the next day. The present disclosure focuses on power producers who are price takers that are not capable of influencing system or regional MCPs, therefore they have to schedule their generators based on the estimated MCPs. Ideally, the power producers can estimate the MCPs for the next day based on other power producers' historical offers and power consumers' historical bids, and weather forecasts. However, in some electricity markets, the trading details for each market player either a power producer or a power consumer are not open to public, except some system-wide trading summaries. Therefore, power plants have to schedule their generators based on the estimated MCPs with limited available information from ISO, but none of other power producers or any power consumer information.

Still referring to FIG. 1C, the uncertainty of day-ahead MCPs contributed by uncertain load forecast, competitors' and consumers' behaviors, and weather conditions are combinedly modeled as a set of stochastic MCPs with Gaussian distribution. The day-ahead MCPs are defined by region, and the prices are equal for all regions only when there are no network congestions. The regional MCPs are related to system-wide trading summaries, including total sell amounts, total buy amounts, MCPs, and MCQs for a set of historical days whose values are highly correlated with prices of the next day determined by correlation analysis, including previous day, and previous week same day. The MCPs are also related to regional weather information, such as temperatures, and inter-regional network capacities and usages. Although detailed loads from each power consumer and generations from each power producer are not available, the planned power flows and capacities at both directions on the tie lines that connected among regions are usually available or can be predicted which can be used for helping price estimation.

Still referring to FIG. 1C, the possible MCPs for the next-day is estimated using a feed-forward neural network model. The neural network is configured to take historical total sell and buy amounts, historical MCPs and MCQs, regional estimated temperatures, inter-regional planned tie flows and capacities at positive direction, and inter-regional planned tie flows and capacities at negative direction as inputs, and regional MCPs for the next day as outputs. The neural network is trained with a set of historical data set for a period of days, wherein each data set corresponding to a specific day includes historical total sell and buy amounts, historical MCPs and MCQs, regional actual temperatures, inter-regional actual tie flows and capacities at two directions as inputs, and actual regional MCPs as outputs. Then possible MCPs for the region that the power plant under study is located can be determined for next day based on the outputs of the trained neural network generated by fed into required historical trading and predicted weather and planned tie flows as inputs. The possible regional MCPs for the next-day can be obtained by predicting all scheduling intervals of the next day simultaneously using one neural network, or by predicting each scheduling intervals of the next day separately using an independent neural network for each scheduling interval. Those predicted MCPs are used to set the mean values for stochastic prices, and the standard deviations of stochastic prices are set based on the mean values and a percentage of standard deviation over mean value for each scheduling interval that determined by the statistics of deviations between the estimated MCPs and actual MCPs for the set of historical data set that used for neural network training. After the mean values and standard deviations of day-ahead MCPs are obtained, we determine a set of sampling MCP scenarios up to maximal allowed bidding steps to represent the stochastic distribution of day-ahead MCPs. Those samples evenly distribute within three-time standard deviations around the predicted MCPs, and each scenario is defined by a corresponding set of prices for each scheduling interval and associated distribution probability determined based on its deviation from the predicted MCPs. Considered that a power plant can only achieve its profit objective by successfully selling its energy to the ISOs and a lower price means a higher chance to be accepted by the ISOs, we define an acceptance probability distribution for each price scenario based on the deviation of price scenario to the mean value of predicted prices and correctly represent a higher price scenario with a lower acceptance probability, i.e. higher risk. Using the determined acceptance probability distribution, the power plant can determine their offering strategy using various bidding strategies. For example, a risk-averse power producer may schedule its generation more favorable for price scenarios with lower profit gains but lower risks rather than ones with higher profit gains but higher risks. Meanwhile, a risk-seeking power producer may schedule its generation more favorable for scenarios with higher risks but higher profit gains.

The present disclosure discloses a method for controlling activation of generation units of a power plant which physically connects to an electric power system through transmission lines, wherein the electric power system is operated by an ISO, and have at least one more power producer producing powers and at least one power consumer consuming powers, wherein the power producer communicates with the ISO through bi-way communication links. Still referring to FIG. 1C, in the day-ahead electricity market, power producers aim to submit optimal stepwise supply offer curves before a given time to the ISOs. Note that, the power producer's supply offers that are in pairs of price and quantity for each time-step. For example, one half-hour interval in up to a certain number of steps (i.e. depends on the ISO) that are arranged according to increasing prices. Power producers obtain these offers by self-scheduling their generators by compromising profit gains and risk control caused by market uncertainties.

The present disclosure discloses a two-objective optimal model for determining optimal offering curves for a power plant over the scheduling intervals of the next day. The first objective represents a risk-averse strategy to maximize the expected profit gains for generation production over all price scenarios, and the profit for each scenario is weighted by its acceptance probability. The second objective represents a risk-seeking strategy to maximize the expected profits for most risky but profitable price scenarios (for example, 5% of total cases) that determined according to a pre-determined confidence level (for example, 95% if 5% of total cases is considered to be most risky). Meanwhile, the offering needs to satisfy the offer curve logistics, i.e. monotonically increasing for each scheduling interval, and smooth scenario transition constraints, i.e. ramping capacity constraints among scenarios that may be awarded by ISOs for different scheduling intervals, and generator-wise constraints such as maximum/minimum capacity, ramping rates and on/off times and durations. By using fuzzy set theory to define each objective's satisfaction degree, the simultaneous optimization of two objectives is replaced with optimization of overall satisfaction of two objectives, therefore a single-objective optimization problem is solved instead. The results of this optimization provide an optimal set of bidding points for each scheduling interval to construct power supply offer curves by making best comprise between profits and risks, including how much power the power plant should provide and with what price for each step, and how much each unit should provide for each step.

The objectives of joint generation scheduling and bidding optimization are related to the net profit gain of the power plant for each price scenario, which is calculated by subtracting the cost of generating power from the revenue from selling power. The cost of power generation includes operating costs, fixed costs and start/shut-down costs. The revenue from selling power is calculated by multiplication of the price and the energy sold that makes the objectives non-linear. The constraints include power generation limits, minimum committed/de-committed times and durations, ramp up/down rates of the generators, and some of constraints are non-linear. Considered some of the decision variables are binary, the above-formulated power producer's scheduling and bidding optimization is a mixed integer non-linear optimal problem. For sake of computation efficiency, it is desirable to convert this mixed integer nonlinear problem to be a mixed integer liner problem to be solved. The nonlinearity introduced by the constraints and cost functions can be easily converted into linear ones through piecewise or averaging expression. The challenge remained is how to deal with the nonlinearity introduced by the multiplication of prices and quantities that both are to be determined for the offering curve determination. In this disclosure, the price for each scheduling interval is limited to only choosing from the set of sampling MCP scenarios that determined using neural network approach. Then a heuristic approach, gradual-decreasing price staircase approach is used to iteratively solve the optimization problem with fixed price scenarios. The problem is first solved by setting the price of all offer curve steps of each scheduling interval using the highest price scenario for all price scenarios of the interval. Then gradually reducing the prices for steps using price scenario chosen from remaining price scenarios until no new better solution is founded. The solution starts from a feasible solution, then iteratively solved within feasible region until no better solution is found. Using such approach, the quantity is decoupled from the price, therefore the formulated optimization problem is simplified as mixed integer linear programing, in comparison the original is a mixed integer non-linear one.

Figure 2:
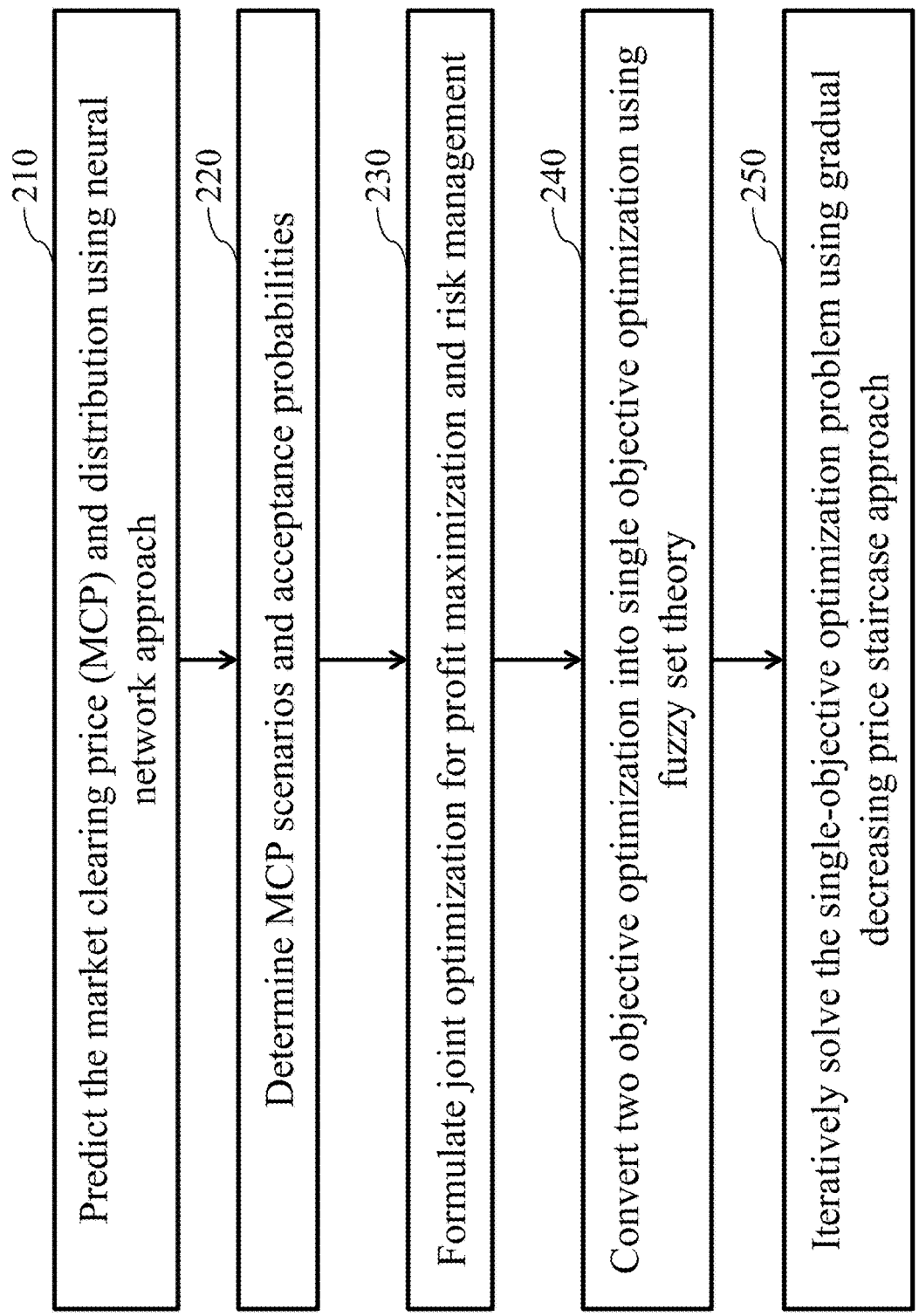
FIG. 2 is a block diagram illustrating some method steps for determining a joint generation scheduling and bidding optimization plan for a power plant, according to some embodiments of the present disclosure.

FIG. 2 is a block diagram illustrating some method steps for determining a joint generation scheduling and bidding optimization plan for a power plant, according to some embodiments of the present disclosure;

FIG. 2 illustrates solving joint generation and bidding optimization of a power plant through a set of consecutive steps, including predicting MCPs for each time-interval of next day based on historical MCPs, MCQs, total sell and buy amounts, predicted regional temperatures and inter-regional power transfers and capacities using neural network approach, in which two directional flows on the tie lines are included to facilitate predicting MCP by region if inter-regional power transfers are congested (step 210); determining a set of MCP scenarios up to maximal allowed bidding steps based on the price mean values predicted using neural networks using latest price and trading summers and predicted next-day weather and tie flows, and price standard deviation estimated based on mismatches between actual MCPs and neural network estimated MCPs using historical data sets, and estimating associated offer acceptance probability distribution based on the deviations of each scenario to the predicted MCP (step 220); formulating a two-objective optimal model for generation scheduling and bidding for all scheduling intervals of the next day to simultaneously maximize expected profits for generation production over all price scenarios, and over most risky price scenarios (such as 5%), while satisfying offer curve logistics for each scheduling interval, offering transition among consecutive intervals, and generation unit technical constraints (step 230); replacing simultaneous optimization of two objectives with optimization of overall satisfaction of two objectives, therefore a single-objective optimization problem is solved instead (step 240); and iteratively solving the converted single objective optimization problem with fixed price scenarios using a gradual decreasing price staircase approach to avoid non-linearity introduced by quantity and price coupling (step 250).

The joint generation and bidding optimization of a power plant is a complicated stochastic mixed integer non-linear programming problem, in which the nonlinearity of the model is mainly introduced by energy selling revenue which is determined by multiplication of supply offering quantities and prices that both are decision variables to be determined. Meanwhile the generation unit on/off statuses for defining the generation scheduling are binary variables which further increased the complicity of the problem. As shown in Step 210 of FIG. 2, the offering price variables are firstly limited to a set of determined price scenarios through predicting MCP and its deviation. Step 250 then uses an iterative reducing staircase level approach to choose a set of determined sample prices for each bidding steps, thus besides generation unit related variables, only offering quantities are to be determined. Using such approach, the quantity is decoupled from the price, therefore the formulated optimization problem is simplified as mixed integer linear programing, in comparison the original is a mixed integer non-linear one. Due to minimum profit or conditional profit at risk requirements, some of low price scenarios might cause solution infeasible. To this end, the solution starts from a feasible solution, then iteratively solved within feasible region until no better solution is found. Step 250 solve the converted non-linear optimization problem firstly by setting the prices of all offer curve steps of each scheduling interval using the highest price scenario for the interval, then gradually reduce the prices for steps using price scenario chosen from remaining price scenarios until no new better/feasible solution is founded.

The results of the joint optimization determine a set of bidding points for each scheduling interval, including how much power the power plant should provide and with what price for each step, and how much each unit should provide for each step, to construct power supply offer curves that will provide: (1). maximized expected profit gain for generation production over all possible price scenarios; (2). maximized expected profit gain for generation production over most risky price scenarios; while satisfying offer curve logistics for each scheduling interval, offer transition between scheduling intervals, and generator capacity, ramping rate and committing and de-committing time constraints.

Estimation of Market Clearing Prices for Day-Ahead Energy Market

In a competitive day-ahead energy market, energy services are primarily traded through double-auctions for all time-intervals, for example 30 minutes of next day. The marker players are submiting their offers or bids to the market by a defined timing for the next day, and the independent system operators are then balancing power supply and demand balance of the whole system with consideration of technical constraints to determine the awarded supply offers and accepted demand bids.

Figure 3:
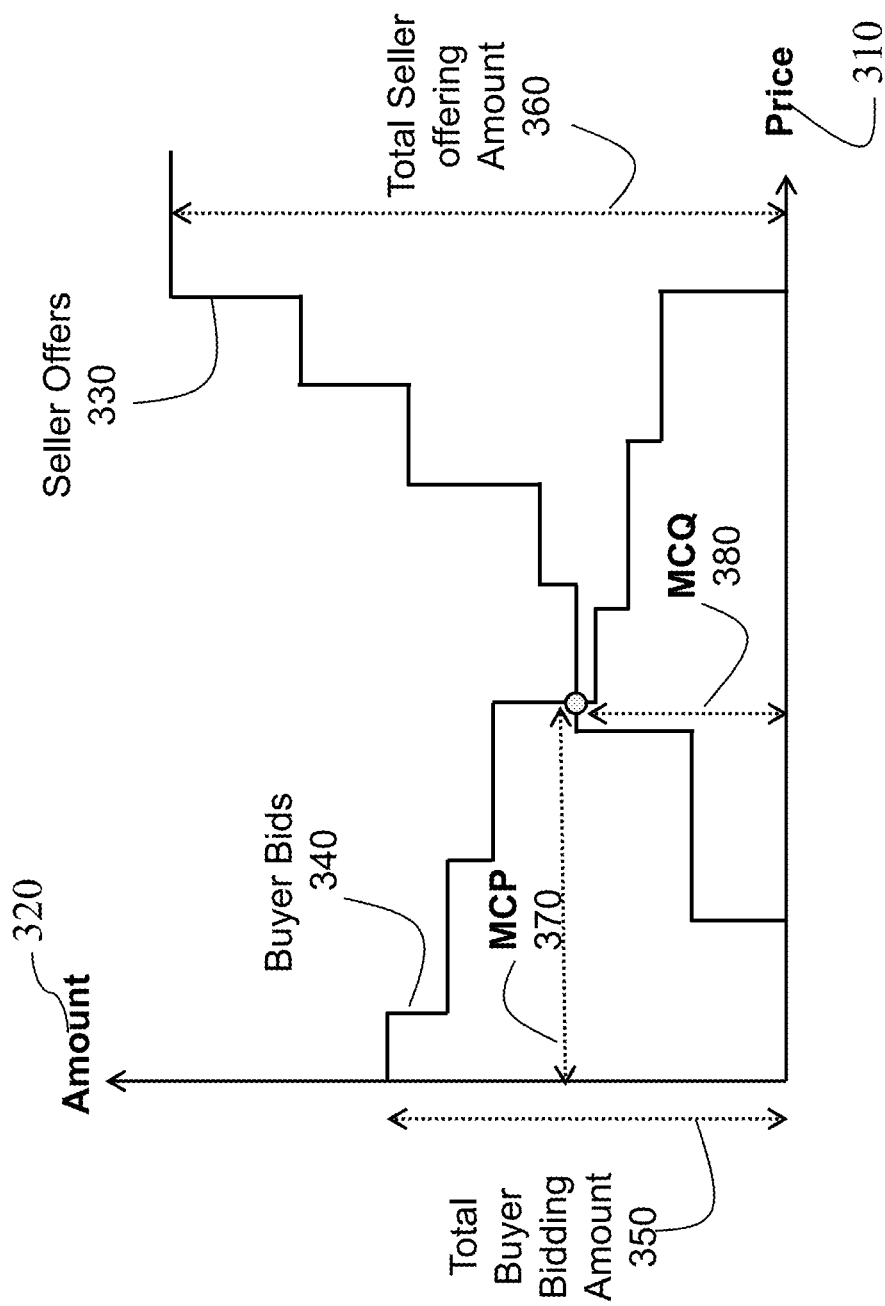
FIG. 3 is a schematic illustrating double auctions and market clearing price determination, according to some embodiments of the present disclosure.

FIG. 3 is a schematic illustrating double auctions and market clearing price determination, according to some embodiments of the present disclosure. The auctions are described in term of trading energy amount, 320 and trading prices, 310. Power plants as sellers submit generation supply offers, 330 for individual or a portfolio of generators at each interval of the next day, while power consumption aggreagators as buyers submit power demand bids, 340 for the next day for same time-intervals. The independent system operators mactches the supplies with the demands to determine a market clearing price, 370 and a market clearing amount, 380. Both the market clearing prices and quantities information, and other trading summaries such as the total buyer bidding amount, 350 and the total seller offering amount, 360 are available to the public after the market is cleared for the next day. Different ISOs may have different policies to handle the trading details for the sellers and buyers. Some ISOs may disclose the seller and buyer trading details to the public anonymously after a time delay, and others may not disclose the trading details to the public in any form, and even the regional trading summaries are not disclosed either. This disclosure is targeted to the energy markets operated by the second type of ISOs.

ISOs usually do not provide the estimated market clearing prices for the next day to the market players. Therefore, the power plants have to make their trading offers based on limited available information, usually only historical system-wide trading summaries, but none of competitors', consumers' or regional summarized past or current offering or bidding.

Figure 4:
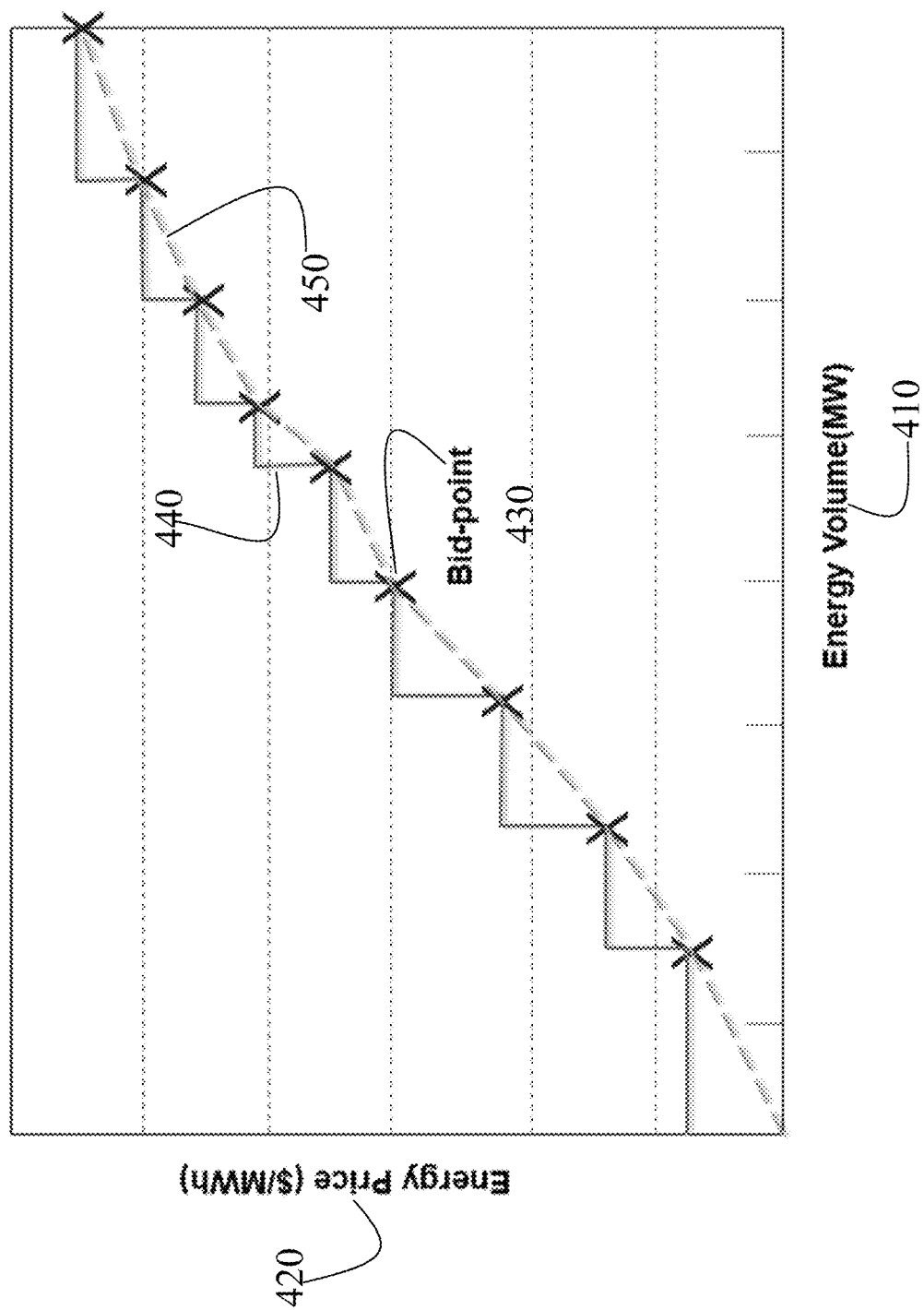
FIG. 4 is a graph illustrating a supply offer curve for a power plant, according to some embodiments of the present disclosure.

FIG. 4 is a graph illustrating a supply offer curve for a power plant, according to some embodiments of the present disclosure. The power producer's supply offer is provided in pairs of price 420 and quantity 410, i.e. bid-points 430 for each time-interval in up to a certain number of steps that are arranged according to increasing prices. The offer curces can be either stepwise 440 or piecewise 450. This disclosure is targeted to the stepwise offering curves, but the disclosed method can easily be extended to the piece-wise ones as well. The maximum number of steps to be allowed is dependent on the ISOs, but this number is usually larger, for examples 20 steps or offer bids.

The MCPs are related to total offering and bidding amounts of the market players, and also the execution capabilities for the power system to implement the MCPs at required location and time. The constraints for such capabilities are mainly from the network power flow constraints. Any congestions on the network causes the auctions and prices cleared by region. Ideally, in order to accurately estimate the MCPs for the next day, detailed estimations for generation productions and load demands for each location at the system, and associated power flows and capacities of each transmission lines are needed. Such information can be available or made to be available to the ISOs, but unfortunately are not available to the power plants when they are making day-ahead scheduling and bidding decisions.

Figure 5:
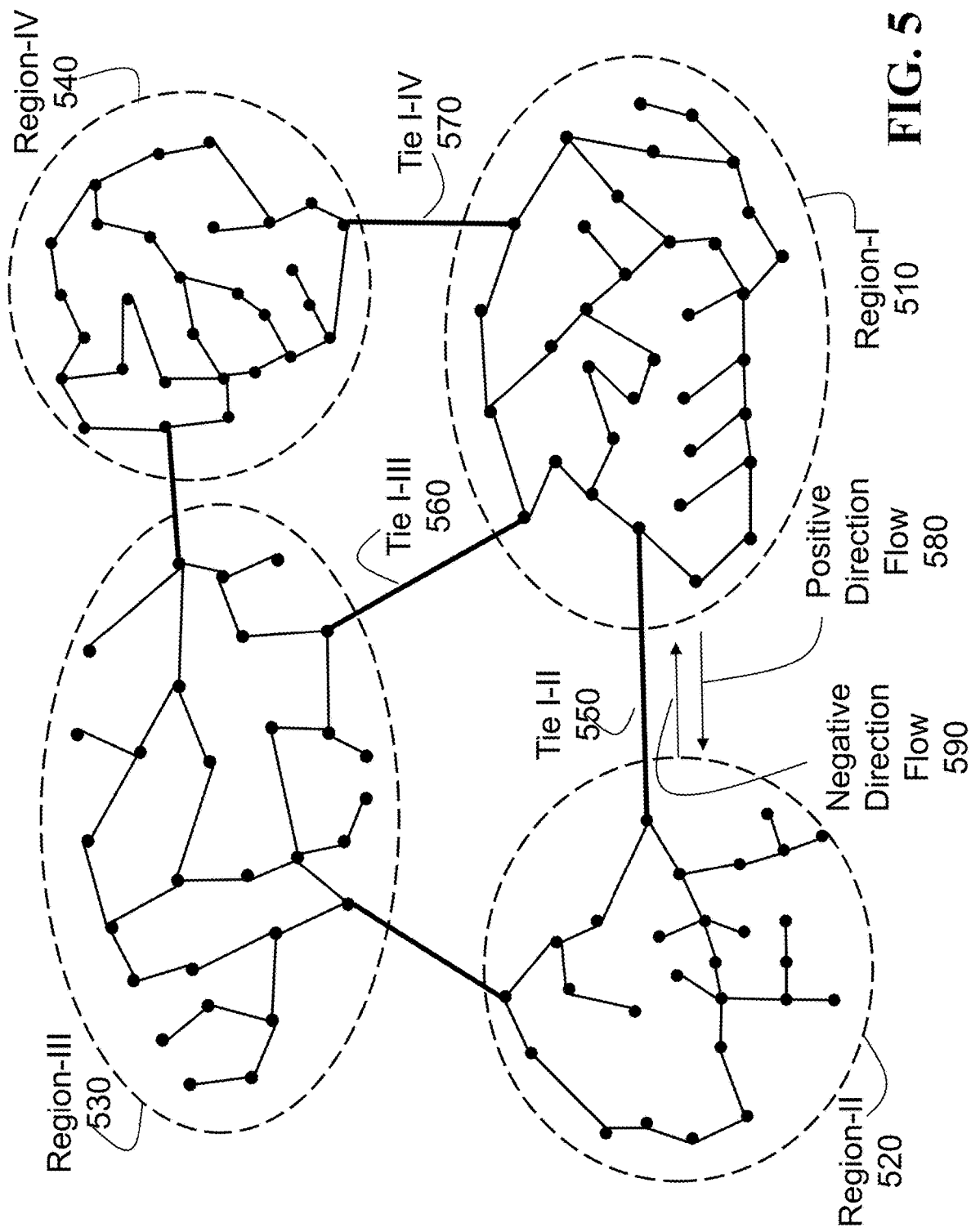
FIG. 5 is a graph illustrating inter-regional connections among different regions of a power system, according to some embodiments of the present disclosure.

FIG. 5 is a graph illustrating an electric power system with multiple regions and inter-regional connections among regions of the electric power system, according to some embodiments of the present disclosure. There are 4 different regions in the system, including Region-I 510, Region-II 520, Region-III 530, and Region-IV 540. There are tie lines connected between different regions. For instances, Region-I 510 has 3 tie lines connected with adjacent regions, including Tie I-II 550, Tie I-III 560, and Tie I-IV 570. Each tie line may experience power flows at different directions, including positive direction 580, and negative direction 590. The positive directional power flow transfers powers out of the region under study, and the negative directional power flow feeds powers into the study region. Although detailed generation and load estimations for the next day for each region are not available, the planned tie flows and available capacities for the next day are usually available that may be used to help identifying possible regional congestions for the next day.

To achieve joint optimization of generation scheduling and bidding for the next day under uncertain MCPs, and competitor/consumer behaviors, we first predict the possible MCPs and possible deviation distributions for each time-interval of the next day based on machine learning approach using historical system-wide trading summaries and predicted regional weather and inter-regional directional tie flows and capacities. Tie flows can be estimated by ISOs based on next-day's regional power balances, and tie capacities may be estimated based on existing outages and planned maintenance or commission schedule. Therefore, the uncertain prices are replaced with a set of sample price scenarios and each scenario has a related determined acceptance probability.

Figure 6:
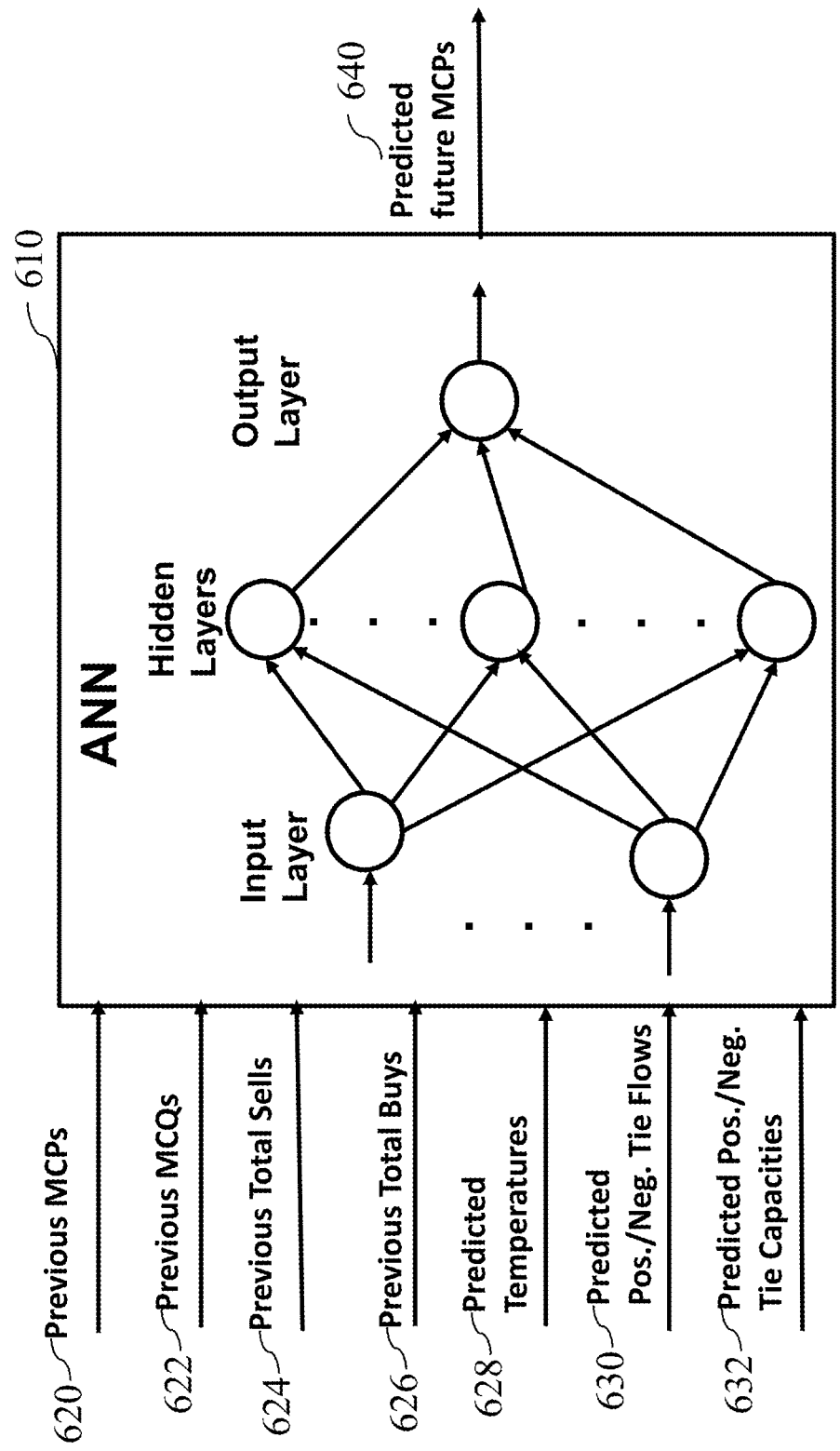
FIG. 6 is a block diagram illustrating some method steps for using artificial neural networks to predict day-ahead MCPs for a power plant located at a specific region of a power system, according to some embodiments of the present disclosure.

FIG. 6 is a block diagram illustrating some method steps for using artificial neural networks to predict day-ahead MCPs for a power plant located at a specific region of an electric power system, according to some embodiments of the present disclosure. The neural network 610 is used to model the relationship between the input variables and output variables. The input variables include MCPs 620 and MCQs 622 for all intervals of a set of historical days, total sells 624 and buys 626 for all intervals of a set day of historical days, regional temperatures at all regions for all intervals of the next day, planned flows 630 and capacities 632 at positive direction and negative direction of tie lines that connected the power plant located region with adjacent regions for all intervals of the next day. The historical days may, for example, include the previous day, the previous week same day. The output variables include the MCPs 640 for all intervals of the next day. It is first trained using a set of known sample pairs of inputs and outputs. Then the trained network can be used to determine the output values when a new set of inputs are fed into the network. It is noted that more days can be added into the historical days if needed or proved by correlation analysis, and MCQs can be included into the output variables if there is a need for predicting MCQs.

The MCPs are related to aforementioned input variables according to:

$$MCP^{d,r} = f\begin{pmatrix} MCP^{d^h,r} \\ MCQ^{d^h} \\ TolSell^{d^h} \\ TolBuy^{d^h} \\ Temp^{d,r} \\ TieFlow^{d,r+} \\ TieCap^{d,r+} \\ TieFlow^{d,r-} \\ TieCap^{d,r-} \end{pmatrix} + e^d \quad (1)$$

Where bold letters represent a vector or a set of variables. $MCP^{d,r}$ is the vector of MCPs for region r of all scheduling intervals of the next day d, f(.) is the relationship function for $MCP^{d,r}$, $e^d$ is the vector of random errors for all scheduling intervals of day d. $MCP^{d^h,r}$ is the vector of the MCPs for region r of all scheduling intervals of each of historical days $d^h$. $d^h$ may include a previous day, and a previous week same day. $MCQ^{d^h}$, $TolSell^{d^h}$, and $TolBuy^{d^h}$ are the vectors of MCQs, total sell and buy amounts for the system of each of historical days $d^h$. $Temp^{d,r}$ is the vector of temperatures for each of region r of all scheduling intervals of the next day d. $TieFlow^{d,r+}$ and $TieFlow^{d,r-}$ are the positive-directional and negative-directional power flows on the tie line connected to regional r for the day d. $TieCap^{d,r+}$ and $TieCap^{d,r-}$ are the positive-directional and negative-directional power flow capacities on the tie line connected to regional r for the day d. Many approaches can be used to estimate the f(.), such as multiple-regression analysis, and artificial neural network approach (ANN). In this invention, ANN is used.

In this patent application, we first use a machine learning based method to predict the regional MCPs and its probability distribution based on historical regional MCPs, system-wide MCQs, system-wide total sell and buy amounts, estimated next-day all regional temperatures and planned next-day bi-directional inter-regional tie flows and capacities. The stochastic distribution of regional MCP is modeled using Gaussian distribution. The mean values of MCPs are estimated based on the outputs of ANN fed by required historical and day-ahead data, as shown in FIG. 6. The ANN is trained using a set of historical input-output data, and the standard deviations are estimated based the mismatch distribution between actual MCPs and estimated MCPs using the trained ANN for historical training data set.

Figure 7:
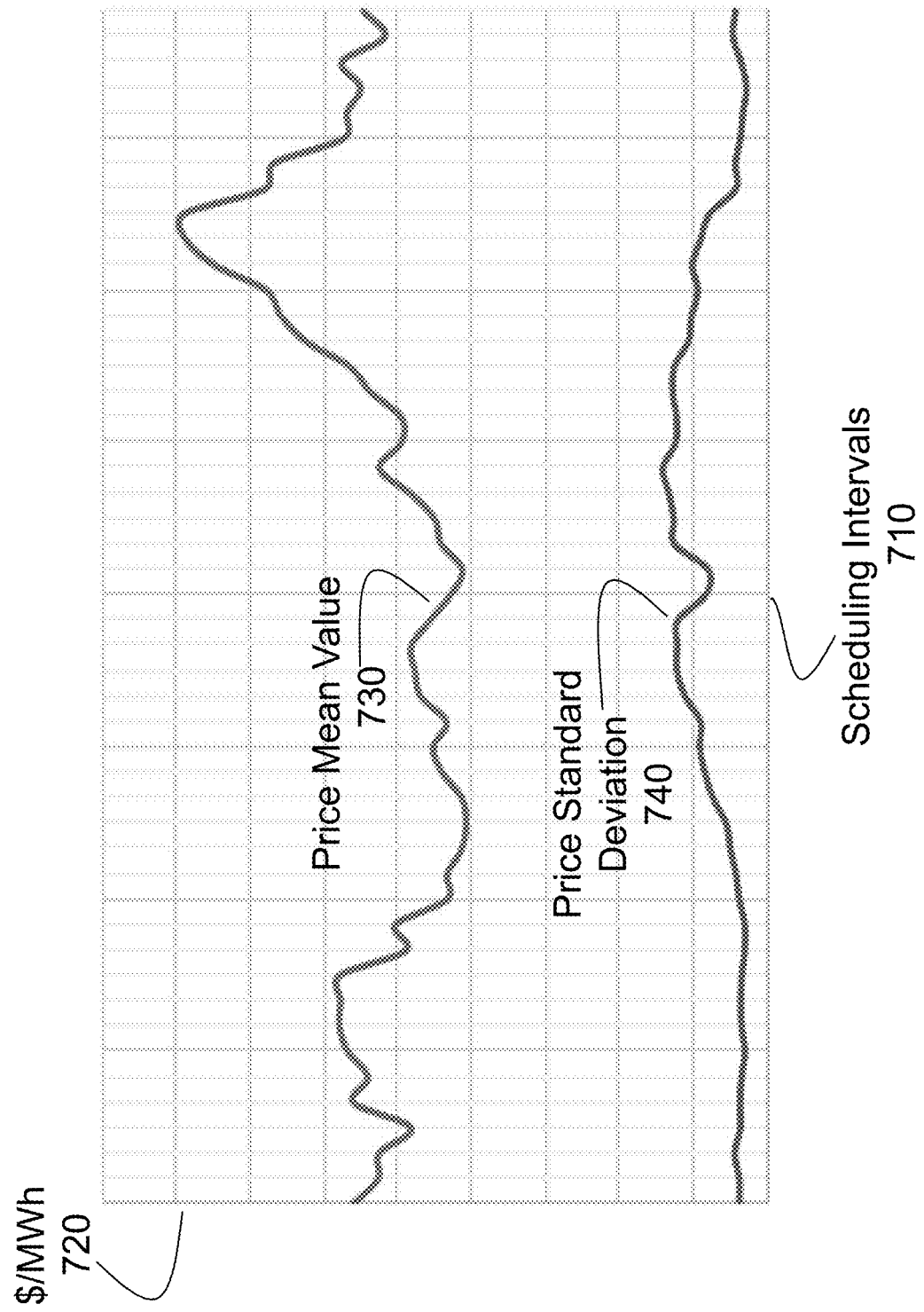
FIG. 7 is an exemplar graph illustrating the variations of the determined mean values and standard deviations of MCPs for the next day, according to some embodiments of the present disclosure.

FIG. 7 is an exemplar graph illustrating the variations of the determined mean values and standard deviations of MCPs 720 over scheduling intervals 710 of the next day, according to some embodiments of the present disclosure. For each scheduling interval, we have a predicted mean value 730 and standard deviation value 740 for the MCPs.

After obtaining the distribution of MCPs, the next step is creating sample price scenarios and estimating associated distribution probability. Assumed ISO allows each offering curve can have S steps at maximum, then we can create S different price scenarios accordingly. The distribution probability for each scenario is calculated based on mean values and standard deviations estimated using ANN and a predetermined confidence level (such as 99.7%).

Figure 8A:
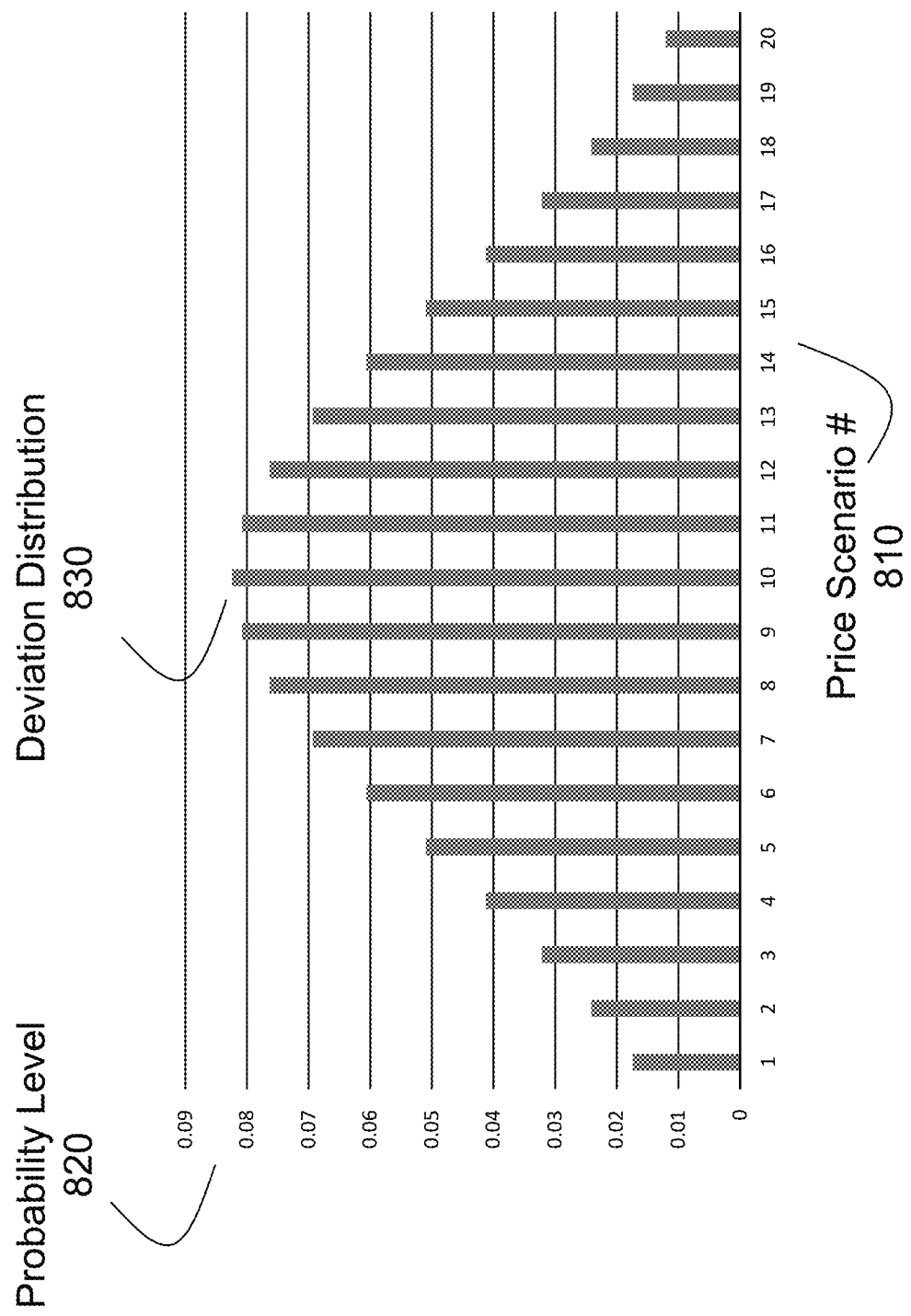
FIG. 8A is an exemplar graph illustrating the determined price scenario deviation probability distribution, according to some embodiments of the present disclosure.

FIG. 8A is an exemplar graph illustrating the determined price scenario and deviation probability distribution, according to some embodiments of the present disclosure. The vertical axis represents the probability level 820 and the horizontal axis represents the serial number of price scenario 810, and the higher serial number means higher price. The vertical axis represents the related probability level of the price scenario. FIG. 8A is used to demonstrate the price deviation distribution density 830.

For scheduling interval t, we can create a set of sample scenarios, S in total to represent the possible MCP distribution. The market clearing price for sample scenario s, $MCP_{s,t}$ can be determined according to:

$$MCP_{s,t} = \mu_t^{MCP} + \frac{(s - S/2)}{S/2} \omega^{MCP} \sigma_t^{MCP}, \quad (2)$$

$$s = \{1, \ldots, S/2 - 1, S/2, S/2 + 1, \ldots, S\}$$

where $\mu_t^{MCP}$ and $\sigma_t^{MCP}$ of are the mean and standard deviation of MCP at scheduling interval t, $\omega^{MCP}$ is the number of standard deviations that MCP data falls within $\omega^{MCP}$ standard deviations of the mean with a given estimation confidence level. For example, $\omega^{MCP}$ is set as 3 if the estimation confidence level is 99.7%. As shown in (2), the higher s corresponds to a higher price.

The distribution probability for sample scenario s, $Prob_{t,s}^{DIS}$ is is determined as:

$$Prob_{s,t}^{DIS} = \frac{\exp\left(-\frac{(MCP_{s,t} - \mu_t^{MCP})^2}{2(\sigma_t^{MCP})^2}\right)}{\sum_{s=1}^{S} \exp\left(-\frac{(MCP_{s,t} - \mu_t^{MCP})^2}{2(\sigma_t^{MCP})^2}\right)} \quad (3)$$

Figure 8B:
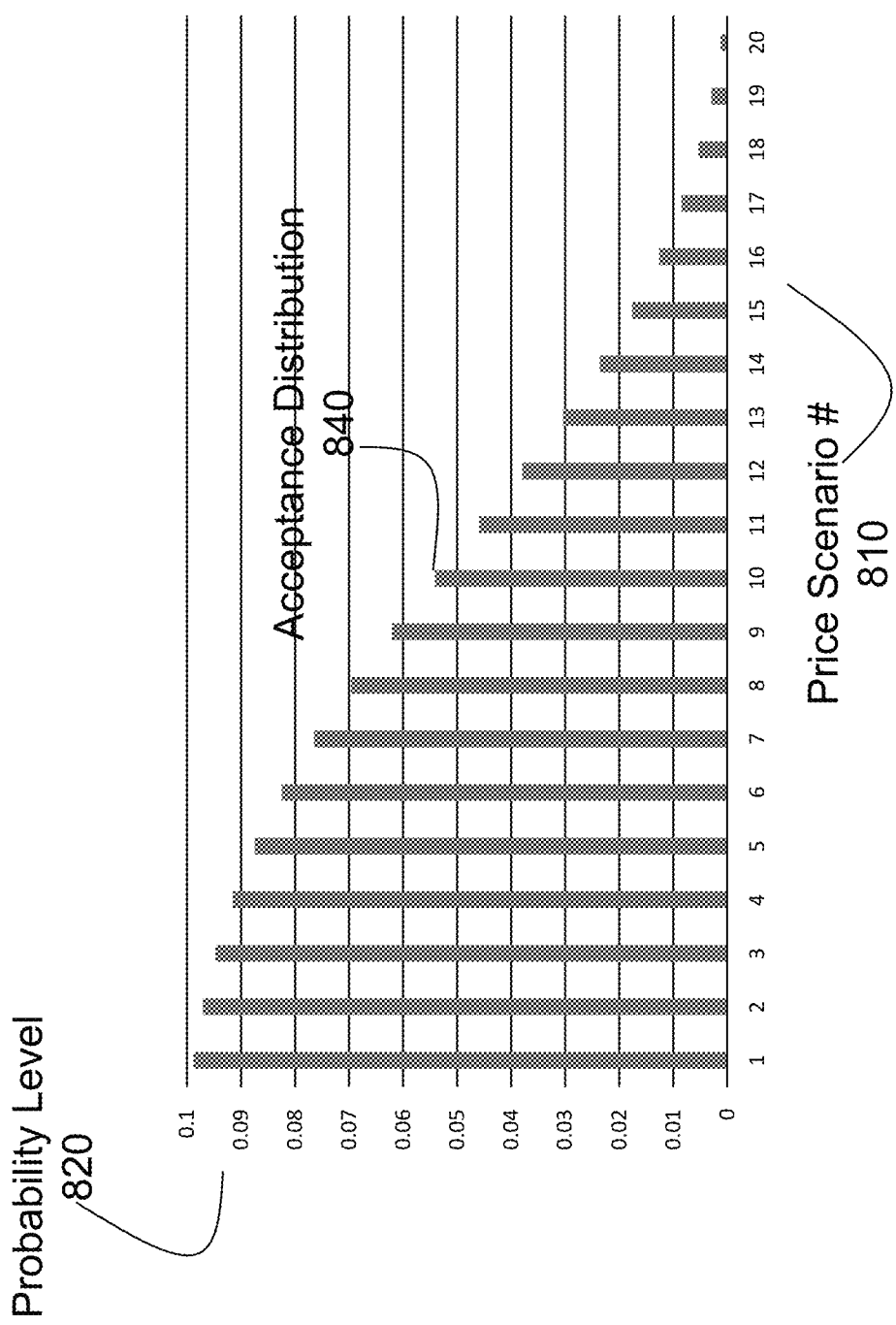
FIG. 8B is an exemplar graph illustrating the determined price scenario acceptance probability distribution, according to some embodiments of the present disclosure.

FIG. 8B is an exemplar graph illustrating the determined price scenario acceptance probability distribution, according to some embodiments of the present disclosure. FIG. 8B is used to demonstrate the acceptance probability distribution 840 of price scenarios 810.

As shown in FIG. 8B, the distribution probability is then converted into acceptance probability based on the accumulation of distribution probability. For sample scenario s at scheduling interval t, its acceptance probability, $Prob_{s,t}^{MCP}$ is determined as:

$$Prob_{s,t}^{MCP} = \frac{\sum_{t=s}^{S} Prob_{t,s}^{DIS}}{\sum_{s=1}^{S} \sum_{t=s}^{S} Prob_{t,s}^{DIS}} \quad (4)$$

The higher price scenario corresponds to a lower acceptance probability.

After the acceptance probabilities for all scenarios are obtained, we can accumulate the acceptance probability from lower scenario to higher scenario to get the accumulated probability for each scenario. Then, when a confidence level regarding risk is given, we can determine the set of scenarios whose accumulated probability is equal or greater than the given confidence level. The scenarios satisfied this condition are the most-risky scenarios that we are used to evaluate a risk-seeking scenario for joint scheduling and bidding optimization.

Figure 8C:
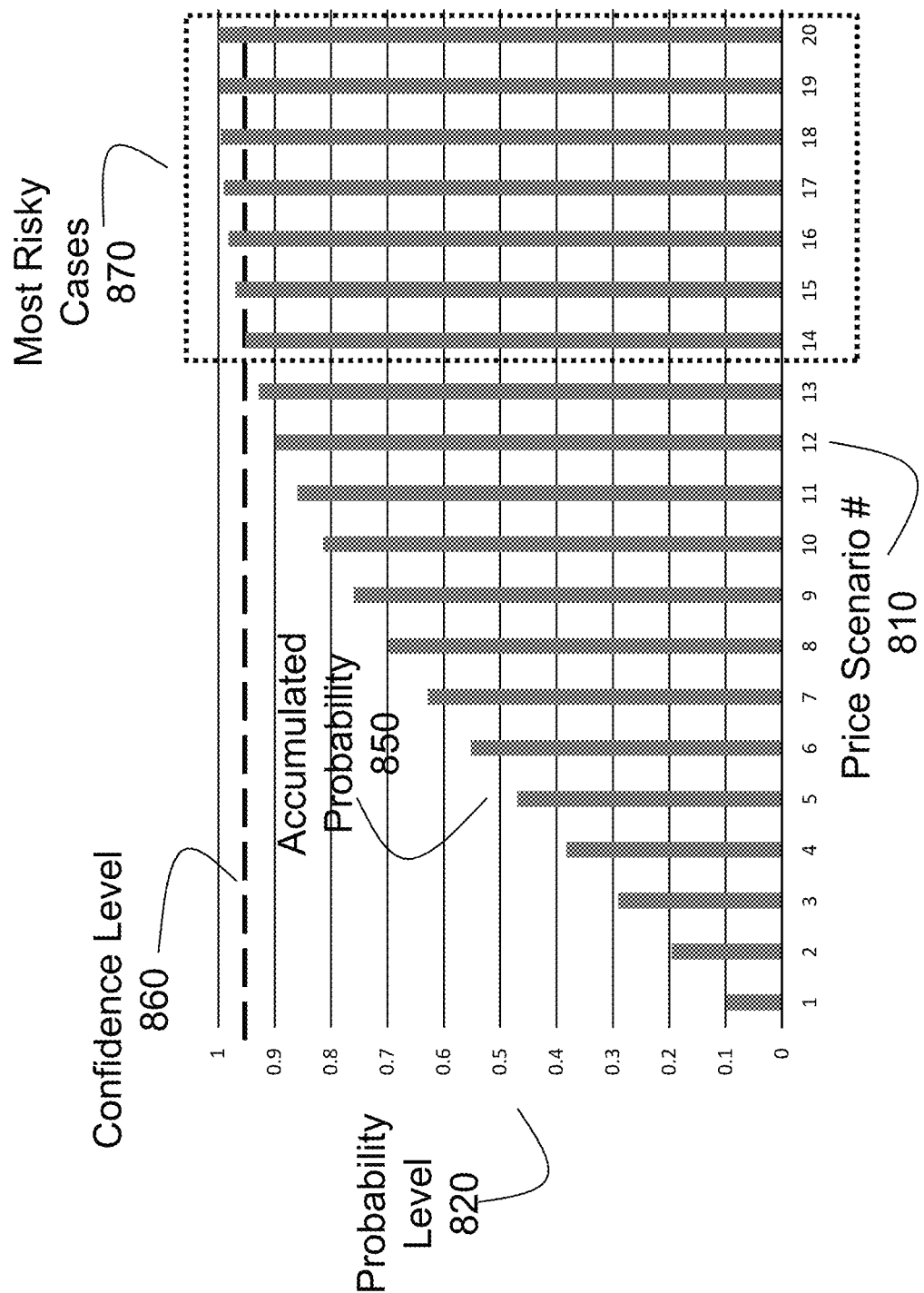
FIG. 8C is an exemplar graph illustrating the confidence level and most risky price scenario cases used for calculating conditional value at risk for profits, according to some embodiments of the present disclosure.

FIG. 8C is an exemplar graph illustrating the risk-based confidence level and most risky price scenario cases used for calculating conditional value at risk, according to some embodiments of the present disclosure. FIG. 8C is used to demonstrate the accumulated acceptance probability 850 of price scenarios. It is used to identify the most risky cases 870 that used to determine the conditional profit at risk for the purpose of risk management. When a confidence level 860 is given, all cases corresponding to the accumulated probability that equals or greater than the confidence level are identified as most risky cases. Those risky cases represent most profitable scenarios if accepted by the ISOs but with higher risks to be rejected by the ISOs.

Formulation for Joint Scheduling and Bidding Optimization

The goal of generation scheduling and bidding optimization of a power plant is to maximize the net profit gains by successfully selling its energy to ISO with manageable risks while satisfying the generator technical constraints. The tasks of joint optimization are to determine supply offering curves for energy bids in pairs of quantities and prices to achieve above goal, and determine generation unit commitment and dispatch schedule to meet the requirements for bids. The results for the problem can provide a set of bidding points for each scheduling interval, including how much power the power plant should provide and with what price for each step, and how much each unit should provide for each step. The power plant should optimize its bidding strategy and scheduling plan by making best compromise between profit gain and risk control.

Taken a thermal power plant as example, this disclosure formulates the joint scheduling and bidding optimization problem under uncertain MCPs as a two-objective stochastic optimization problem. The uncertain energy prices are modeled using a set of determined energy price scenario with different acceptance probability based on the estimation of MCP and distribution probability. The first objective of the optimization is maximizing the expected profit gains for all energy price scenarios of each scheduling interval of next day. The first objective is used to evaluate the performance of decision-making when a risk-averse strategy is used by the power plant. The net profit gain for each scenario is weighted by its acceptance probability when calculating the expected profit gains. The second objective of the optimization is maximizing the expected profit gains for most risky scenarios for each scheduling interval of next day. The second objective is used to evaluate the performance of decision-making when a risk-seeking strategy is used by the power plant.

The constraints for joint scheduling and bidding optimization include the offering curve logistics, that is the prices must be strictly increasing among consecutive steps with the energy quantity increases for a multi-step offering curve at each scheduling interval, and must be chosen from the determined energy price scenarios. The constraints also include ramping capacity constraints for possible scenario transition among two consecutive scheduling intervals to facilitate that ISOs may choose different scenario for different intervals. There are also constraints for generation units, including maximum/minimum capacity limits, upward/downward ramping rates, minimum on/off times and duration constraints.

The formulated optimization problem is a two-objective mixed-integer non-linear optimization problem. The decision variables include bid points for promised energy quantity and asked energy prices, generation unit on/off statues, start-up and shut-down states, and generation output levels. Due to the large number of decision variables and nonlinearity introduced by revenue calculation, a computation efficient solution algorithm is needed. In this disclosure, the problem is first converted into a single-objective nonlinear problem by maximizing the overall satisfying degree of two objectives, then a heuristic approach to iteratively solve a set of mixed integer linear programming problems by fixing step prices using gradual decreasing price staircase approach.

Considered the ramping and start-up/shut-down capabilities of different generators, the generation unit can have three different type of unit commitment schedule to deal with the variation of price scenarios, including price scenario group-based scheduling, price scenario-based scheduling, and price scenario invariant scheduling. The unit commitment schedule is defined by the unit on/off status over all scheduling intervals for the next day. For a price scenario group-based scheduling, all price scenarios of the group under study uses a same unit commitment schedule. For a price scenario-based scheduling, each price scenario has its own unit commitment schedule. For a price scenario invariant scheduling, a common unit commitment schedule is used no matter what the price scenario is used. Price scenario group-based scheduling and price scenario-based scheduling are used for generators with quick startup capabilities, and price scenario invariant scheduling is used for generators that needs longer time to start up.

The objectives of the problem are to maximize the expected profit gains over all price scenarios, and the expected profit gains over most risky but profitable scenarios (i.e. conditional value at risk for profit gain) simultaneously:

$$\text{maximize } E(\text{Gain}^{total}) \quad (5)$$

$$\text{maximize } CVaR^{gain} \quad (6)$$

$E(\text{Gain}^{total})$ is the expected total profit gain and calculated according to:

$$E(\text{Gain}^{total}) = \Sigma_{s=1}^{S} \text{Prob}_s \text{Gain}_s^{total} \quad (7)$$

s, and S are the index for price scenario, and the total number of price scenarios. $\text{Gain}_s^{total}$ and $\text{Prob}_s$ are the total profit gain, and acceptance probability for scenario s, respectively. $\text{Gain}_s^{total}$ is defined as the difference between energy selling revenue and energy production cost as:

$$\begin{aligned}\text{Gain}_s^{total} =& \Sigma_{t=1}^{T}[\text{Price}_{s,t}\text{Quota}_{s,t} - \Sigma_{g \in G^{INV}}(\text{FixedCost}_g\\ & \text{ON}_{g,t} + \text{StartUp}_g\text{UP}_{g,t} + \text{ShutDn}_g\text{DN}_{g,t}) - \\ & \Sigma_{n=1}^{N^s}\Sigma_{g \in S^n}(\text{FixedCost}_g\text{ON}_{g,t,n} + \text{StartUp}_g\text{UP}_{g,t,n} + \\ & \text{ShutDn}_g\text{DN}_{g,t,n}) - \Sigma_{g \in G^{SNR}}(\text{Fixedcost}_g\text{ON}_{g,t,s} + \\ & \text{StartUp}_g\text{UP}_{g,t,s} + \text{ShutDn}_g\text{DN}_{g,t,s}) - \\ & \Sigma_{g=1}^{G}\text{OperCost}_g P_{g,t,s}]\end{aligned} \quad (8)$$

t and T are the index for scheduling interval, and the total number of scheduling intervals for the next day g and G are the index for generation unit, and the total number of generation units in the power plant. The generation units in the power plant is divided into three groups, including generators with price scenario invariant scheduling $G^{INV}$, generators with price scenario based scheduling $G^{SNR}$, and generators with price scenario group based scheduling $G^{GRP}$. $N^S$ is the total number of groups for price scenarios, and $S_n$ is the set of price scenarios in group n. $\text{Price}_{s,t}$ and $\text{Quota}_{s,t}$ are the bidding price and energy quantity for scenario s at scheduling interval t. $\text{StartUp}_g$, $\text{ShutDn}_g$, $\text{FixedCost}_g$ and $\text{OperCost}_g$ are the start-up cost, shut-down cost, fixed non-load cost, per unit variable operation cost for generation unit g. $\text{ON}_{g,t}$, $\text{UP}_{g,t}$ and $\text{DN}_{g,t}$ are binary variables to indicate the unit committed, started-up and shut-down status for generation unit g with scenario-invariant scheduling at scheduling interval t, and related to each other as:

$$\text{ON}_{g,t} - \text{ON}_{g,(t-1)} - \text{UP}_{g,t} + \text{DN}_{g,t} = 0, \forall g,t \quad (9a)$$

$\text{ON}_{g,t}$ is equal to 1 if generation unit g is committed at scheduling interval t, $\text{UP}_{g,t}/\text{DN}_{g,t}$ is equal to 1 if the unit is started-up/shutdown at the beginning of scheduling interval t. $\text{ON}_{g,t,s}$, $\text{UP}_{g,t,s}$ and $\text{DN}_{g,t,s}$ are binary variables to indicate the unit committed, started-up and shut-down status for generation unit g with scenario-based scheduling at scheduling interval t when price scenario s is used, and related to each other as:

$$\text{ON}_{g,t,s} - \text{ON}_{g,(t-1),s} - \text{UP}_{g,t,s} + \text{DN}_{g,t,s} = 0, \forall g,t,s \quad (9b)$$

$\text{ON}_{g,t,n}$, $\text{UP}_{g,t,n}$ and $\text{DN}_{g,t,n}$ are binary variables to indicate the unit committed, started-up and shut-down status for generation unit g with scenario group-based scheduling at scheduling interval t when price scenario group n is used, and related to each other as:

$$\text{ON}_{g,t,n} - \text{ON}_{g,(t-1),n} - \text{UP}_{g,t,n} + \text{DN}_{g,t,n} = 0, \forall g,t,n \quad (9c)$$

$P_{g,t,s}$ is the energy production level, i.e. power generated for generation unit g at scheduling interval t and price scenario s.

$CVaR^{gain}$ is the expected conditional value at risk for profit gain. If the risk-based confidence level is a, for example, 95%, the $CVaR^{gain}$ is determined as:

$$CVaR^{gain} = \frac{1}{\sum\limits_{s=S^\alpha}^{S}\text{Prob}_s}\sum_{s=S^\alpha}^{S}\text{Prob}_s\text{Gain}_s^{total}, \quad (10)$$

Assumed the price scenarios are given in increasing order with scenario number s, $S^\alpha$ is the lowest number of price scenario that satisfies $\Sigma_{s=1}^{S^\alpha}\text{Prob}_s \geq \alpha$. $CVaR^{gain}$ represents the expected profit gain for the worst $(1-\alpha) \times 100\%$ cases that have least acceptance probabilities. FIG. 8C demonstrates the relationship between the confidence level 860 and the price scenario cases 870 used for calculating $CVaR^{gain}$.

The bidding offer curves must be monotonically increasing among bidding points (in term of quantity and price pairs) expressed as:

$$Quota_{s,t} \leq Quota_{(s+1),t}, \forall s,t \quad (11)$$

$$Price_{s,t} \leq Price_{(s+1),t}, \forall s,t \quad (12)$$

The bidding price must be chosen from the determined market clearing prices, $MCP_{t,s}$:

$$Price_{s,t} \in \{MCP_{t,1}, MCP_{t,2}, \ldots, MCP_{t,S}\}, \forall s,t \quad (13)$$

The corresponding probability, $Prob_s$ is also determined based on $Prob_{t,s}^{MCP}$ and normalized accordingly.

Each bidding point must satisfy the required minimum profit gain, $\underline{Gain}$, or the required minimum CVaR, $\underline{CVaR}$ if the bidding point is included in the most risky scenario set:

$$Gain_s^{total} \geq \underline{Gain}, \forall s \quad (14)$$

$$Gain_s^{total} \geq \underline{CVaR}, \forall s \quad (15)$$

The ISOs may choose different offering steps among two consecutive scheduling intervals, so the quotas between adjacent scheduling intervals for two different steps with predetermined distance must be satisfied the constraints of generation ramping rates and capacities. Therefore, the offering curves needs to meet the smooth step transition requirements among consecutive scheduling intervals:

$$Quota_{(s+\Delta s),(t+1)} - Quota_{s,t} \leq \sum_{g \in G^{INV}} (ON_{g,t} \overline{RU_g} + UP_{g,t} \overline{SU_g}) + \\ \sum_{g \in G^{GRP}} (ON_{g,t,n} \overline{RU_g} + UP_{g,t,n} \overline{SU_g}) + \\ \sum_{g \in G^{SNR}} (ON_{g,t,s} \overline{RU_g} + UP_{g,t,s} \overline{SU_g}) \; \forall s \in S^n, t \quad (16)$$

$$Quota_{s,t} - Quota_{(s+\Delta s),(t+1)} \leq \sum_{g \in G^{INV}} (ON_{g,t} \overline{RD_g} + DN_{g,t} \overline{SD_g}) + \\ \sum_{g \in G^{GRP}} (ON_{g,t,n} \overline{RD_g} + DN_{g,t,n} \overline{SD_g}) + \\ \sum_{g \in G^{SNR}} (ON_{g,t,s} \overline{RD_g} + DN_{g,t,s} \overline{SD_g}), \; \forall s \in S^n, t \quad (17)$$

Where $\Delta s$ is the allowed number of step variation between two consecutive scheduling intervals, n is the group number for price scenario s. $\overline{RU_g}$ and $\overline{RD_g}$ are the maximum ramping up and ramping down rates for generator g, and $\overline{SU_g}$ and $\overline{SD_g}$ are the maximum starting-up and shutting-down ramping rates for generator g respectively.

The bidding quota is allocated to all committed generation units to determine each unit's production level according to:

$$Quota_{s,t} = \sum_{g=1}^{G} P_{g,t,s}, \forall s,t \quad (18)$$

The generated power for committed generation unit g is constrained by technically constraints, including the minimum power generation limit $\underline{P_g}$ and maximum power generation limit $\overline{P_g}$ constraints, maximum ramping up rate and ramping down rate constraints, and maximum starting-up rate and shutting-down rate constraints:

$$ON_{g,t} \underline{P_g} \leq P_{g,t,s} \leq ON_{g,t} \overline{P_g}, \forall s, g \in G^{INV}, t \quad (19a)$$

$$ON_{g,t,n} \underline{P_g} \leq P_{g,t,s} \leq ON_{g,t,n} \overline{P_g}, \forall s \in S^n, n, g \in G^{GRP}, t \quad (19b)$$

$$ON_{g,t,s} \underline{P_g} \leq P_{g,t,s} \leq ON_{g,t,s} \overline{P_g}, \forall s, g \in G^{SNR}, t \quad (19c)$$

$$P_{g,(t-1),s} - P_{g,t,s} \leq ON_{g,t} \overline{RD_g} + DN_{g,t} \overline{SD_g}, \forall s, g \in G^{INV}, t \quad (20a)$$

$$P_{g,(t-1),s} - P_{g,t,s} \leq ON_{g,t,n} \overline{RD_g} + DN_{g,t,n} \overline{SD_g}, \forall s \in S^n, n,g \in G^{GRP}, t \quad (20b)$$

$$P_{g,(t-1),s} - P_{g,t,s} \leq ON_{g,t,s} \overline{RD_g} + DN_{g,t,s} \overline{SD_g}, \forall s, g \in G^{SNR}, t \quad (20c)$$

$$P_{g,t,s} - P_{g,(t-1),s} \leq ON_{g,(t-1)} \overline{RU_g} + UP_{g,t} \overline{SU_g}, \forall s, g \in G^{INV}, t \quad (21a)$$

$$P_{g,t,s} - P_{g,(t-1),s} \leq ON_{g,(t-1),n} \overline{RU_g} + UP_{g,t,n} \overline{SU_g}, \forall s \in S^n, n,g \in G^{GRP}, t \quad (21b)$$

$$P_{g,t,s} - P_{g,(t-1),s} \leq ON_{g,(t-1),s} \overline{RU_g} + UP_{g,t,s} \overline{SU_g}, \forall s, g \in G^{SNR}, t \quad (21c)$$

The generation unit g can change its committed status when minimum up duration $\underline{UT_g}$, or minimum down duration $\underline{DT_g}$ is satisfied:

$$\sum_{t'=t-\underline{UT_g}+1}^{t} UP_{g,t'} \leq ON_{g,t}, \forall g \in G^{INV}, t \quad (22a)$$

$$\sum_{t'=t-\underline{UT_g}+1}^{t} UP_{g,t',n} \leq ON_{g,t,n}, \forall n, g \in G^{GRP}, t \quad (22b)$$

$$\sum_{t'=t-\underline{UT_g}+1}^{t} UP_{g,t',s} \leq ON_{g,t,s}, \forall s, g \in G^{SNR}, t \quad (22c)$$

$$\sum_{t'=t-\underline{DT_g}+1}^{t} DN_{g,t'} \leq 1 - ON_{g,t}, \forall \forall g \in G^{INV}, t \quad (23a)$$

$$\sum_{t'=t-\underline{DT_g}+1}^{t} DN_{g,t',n} \leq 1 - ON_{g,t,n}, \forall n, g \in G^{GRP}, t \quad (23b)$$

$$\sum_{t'=t-\underline{DT_g}+1}^{t} DN_{g,t',s} \leq 1 - ON_{g,t,s}, \forall g, t \forall s, g \in G^{SNR}, t \quad (23c)$$

The generation unit g's committed status changes are also limited by the maximal allowed numbers, $\overline{SC_g}$ for one day:

$$\Sigma_t (UP_{g,t} + DN_{g,t}) \leq \overline{SC_g}, \forall g \in G^{INV}, t \quad (24a)$$

$$\Sigma_t (UP_{g,t,n} + DN_{g,t,n}) \leq \overline{SC_g}, \forall n, g \in G^{GRP}, t \quad (24b)$$

$$\Sigma_t (UP_{g,t,s} + DN_{g,t,s}) \leq \overline{SC_g}, \forall s, g \in G^{SNR}, t \quad (24c)$$

To reduce the number of binary variables, we model the start-up and shut-down statuses are real numbers, but use the additional status logic constraints to force them to be binary numbers according to:

$$ON_{g,t} - ON_{g,(t-1)} \leq UP_{g,t}, \forall g \in G^{INV}, t \quad (25a)$$

$$ON_{g,t,n} - ON_{g,(t-1),n} \leq UP_{g,t,n}, \forall n, g \in G^{GRP}, t \quad (25b)$$

$$ON_{g,t,s} - ON_{g,(t-1),s} \leq UP_{g,t,s}, \forall s, g \in G^{SNR}, t \quad (25c)$$

$$ON_{g,(t-1)} - ON_{g,t} \leq DN_{g,t}, \forall g \in G^{INV}, t \quad (26a)$$

$$ON_{g,(t-1),n} - ON_{g,t,n} \leq DN_{g,t,n}, \forall n, g \in G^{GRP}, t \quad (26b)$$

$$ON_{g,(t-1),s} - ON_{g,t,s} \leq DN_{g,t,s}, \forall s, g \in G^{SNR}, t \quad (26c)$$

The fuzzy set theory is employed to solve this two-objective optimization problem. First, we define fuzzy sets, $\widetilde{Gain}$ and $\widetilde{CVaR}$ to express the realization degrees of objectives (5) and (6). Their membership functions are defined as follows:

$$\mu_{\widetilde{Gain}^{total}} = \begin{cases} 0 & Gain^{total} \leq \underline{Gain^{total}} \\ \dfrac{Gain^{total} - \underline{Gain^{total}}}{\overline{Gain^{total}} - \underline{Gain^{total}}} & \underline{Gain^{total}} < Gain^{total} \leq \overline{Gain^{total}} \\ 1 & Gain^{total} > \overline{Gain^{total}} \end{cases} \quad (27)$$

$$\mu_{\widetilde{CVaR}^{gain}} = \quad (28)$$

$$\begin{cases} 0 & CVaR^{gain} \leq \underline{CVaR^{gain}} \\ \dfrac{CVaR^{gain} - \underline{CVaR^{gain}}}{\overline{CVaR^{gain}} - \underline{CVaR^{gain}}} & \underline{CVaR^{gain}} < CVaR^{gain} \leq \overline{CVaR^{gain}} \\ 1 & CVaR^{gain} > \overline{CVaR^{gain}} \end{cases}$$

Where, $\underline{Gain^{total}}$ and $\overline{Gain^{total}}$ are the tolerated minimum expected profit gain and the maximum desired expected profit gain. $\underline{CVaR^{gain}}$ and $\overline{CVaR^{gain}}$ are the tolerated minimum expected profit gain at risk and the maximum desired expected profit gain at risk. Since the realization of objective (5), and (6) might be contradictive each other, it might be impossible to completely satisfy all these objectives simultaneously. So, it is the only feasible way to make a compromise that has the maximum overall satisfying degree of all objectives.

Here, fuzzy set $\widetilde{Obj}$ is used to express the overall satisfying degree of the realization of objective (5), and (6), and its membership function is defined as follows:

$$\mu_{\widetilde{Obj}} = \min\{\mu_{\widetilde{Gain}_{total}}, \mu_{\widetilde{CVaR}_{gain}}\} \quad (29)$$

Figure 9:
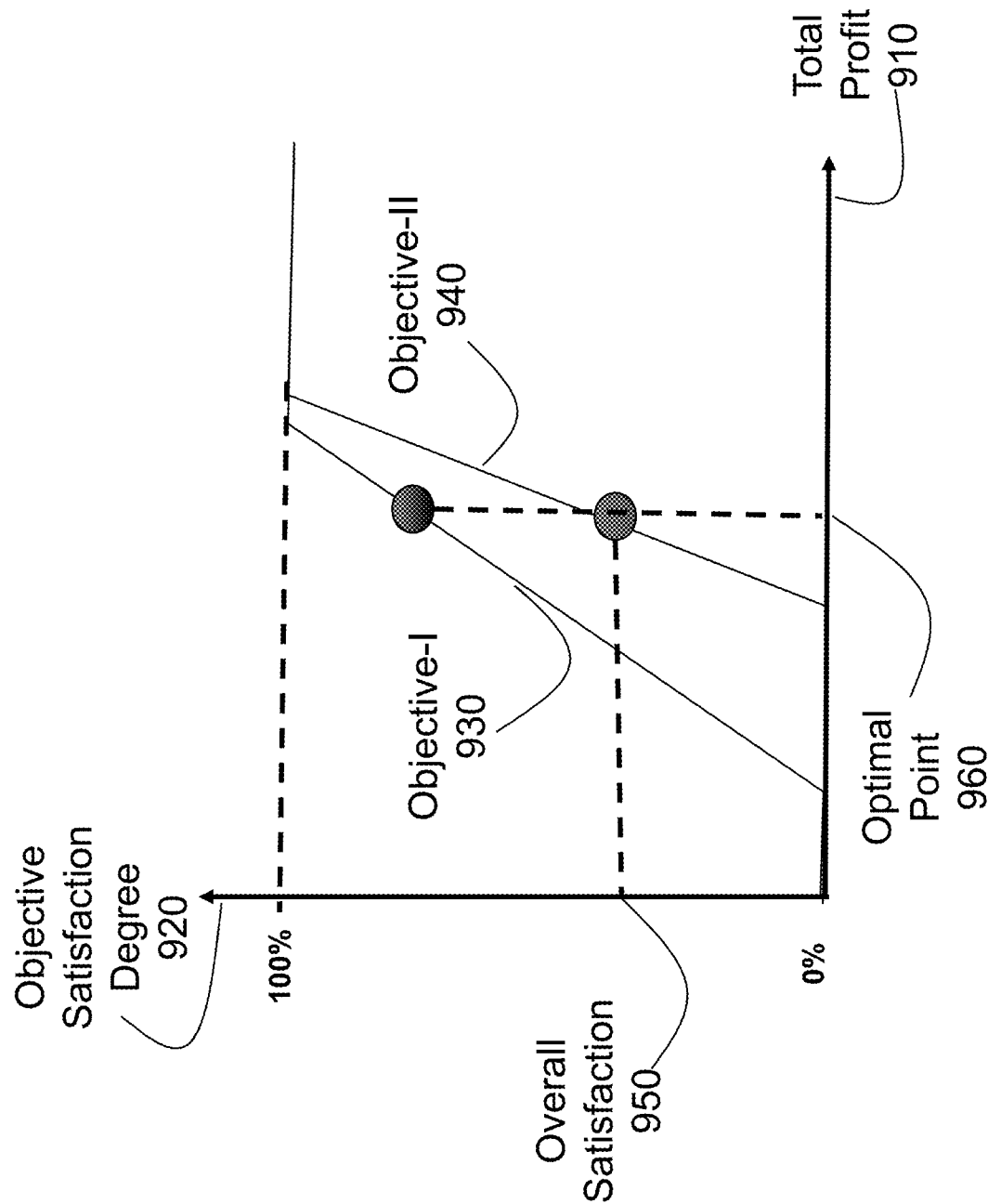
FIG. 9 is a schematic illustrating determination of overall satisfaction degree for two objectives using fuzzy set theory, according to some embodiments of the present disclosure.

FIG. 9 is a schematic illustrating determination of overall satisfaction degree for two objectives using fuzzy set theory, according to some embodiments of the present disclosure. The horizontal axis 910 represents the expected gain value or conditional gain at risk value for the scheduling and bidding plan. The vertical axis 920 represents the corresponding satisfaction degree of each objective achieved by the plan. The membership functions for each objective are represented using curves 930 for the first objective and 940 for the second objective, respectively, such that the first objective 930 and the second objective 940 lines, both cross through the optimal point 960. For any plan, the overall satisfaction degree 950 is defined as the least value of objective satisfaction degrees among two objectives.

Hence, the proposed model described in equations (5)-(26) is equivalently converted to maximize $\mu_{\widetilde{Obj}}$ subject to equations (7)-(26), that is:

$$\text{maximize } \mu_{\widetilde{Obj}} = \lambda \quad (30)$$

Subject to:

$$\mu_{\widetilde{Gain}_{total}} \geq \lambda \quad (31)$$

$$\mu_{\widetilde{CVaR}_{gain}} \geq \lambda \quad (32)$$

$$0 \leq \lambda \leq 1 \quad (33)$$

Equations (7)-(26)

As formulated above, both bidding prices and quantities, $Price_{s,t}$ and $Quota_{s,t}$ are to be determined, the profit gain function is a non-linear function, therefore the optimization problem is a large-scale mixed integer non-linear programming problem.

Solution for Joint Scheduling and Bidding Optimization

Due to offering step monotonically increasing requirements, and coupling between bidding prices and quantities, the above-formulated optimization problem is very complicated, and needs considerable amount of computation efforts to be solved. In order to simplify and fasten the solution process, a gradual decreasing price staircase approach is used to iteratively fixing the price scenarios and obtaining the optimal solution, where equations (11)-(13) are not explicitly included in the optimization formulation but are considered implicitly through price staircase reducing process. The problem is first solved by setting the price of all offer curve steps of each scheduling interval using the highest price scenario for all price scenarios of the interval. Then gradually reducing the prices for steps using price scenario chosen from remaining price scenarios until no new better solution is founded. The idea behind the approach is determining the bidding prices first, then only the bidding quantities need to be determined, and the iterative process is used to enumerate possible bidding prices to obtain the final optimal solution.

Figure 10:
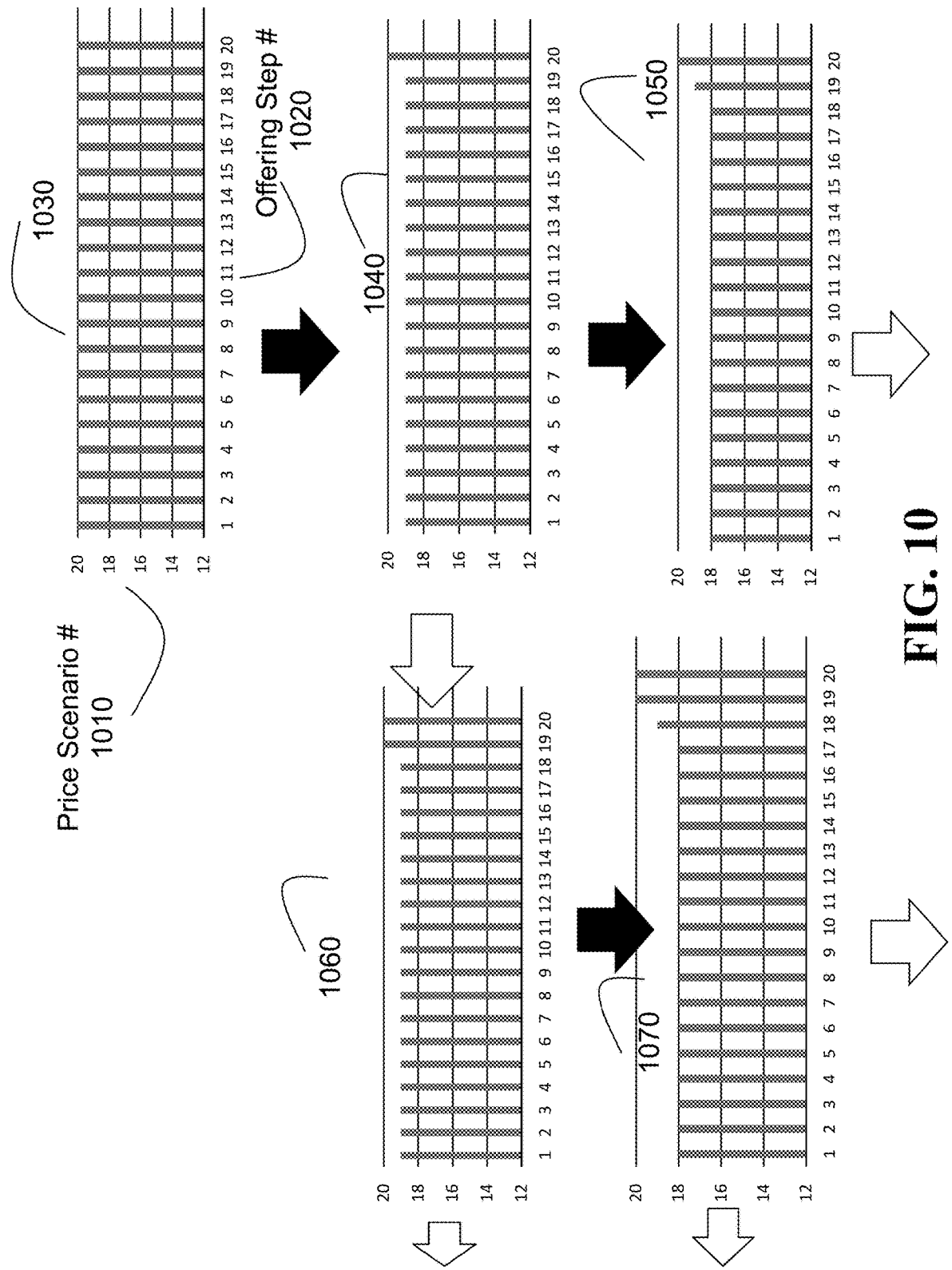
FIG. 10 is a schematic illustrating solving joint generation scheduling and bidding optimization using a gradual decreasing price staircase approach, according to some embodiments of the present disclosure.

FIG. 10 is a schematic illustrating solving joint generation scheduling and bidding optimization using a heuristic approach, i.e. gradual decreasing price staircase approach, according to some embodiments of the present disclosure. In this example, the offer curves are allowed to have maximum 20 offering steps, and 20 different price scenarios are determined accordingly. The price level is illustrating by its scenario number, and a bigger scenario number corresponds to a higher price. The matching of price scenarios 1010 with offering steps 1020 are based on price scenarios and processed one by one. For each price scenario, we determine a set of corresponding steps that whose offering prices are set to be the prices defined in the scenario under study. The process starts from the highest price scenario, i.e. price scenario #20.

For the scenario # 20, we first set the prices for steps from step #1 to step #20 using this scenario's price, 1030 and then solve a joint optimization problem using given set of prices. If a feasible solution is found, then the step #20 is determined to be matched with price scenario #20. The step 20 is the latest step that has a feasible solution. If not, this problem does not have a solution. Because the solution infeasibility usually causes by violating the minimum profit or conditional profit at risk constraints, this highest price scenario should always have a solution. Then we move on to the next scenario, scenario #19.

For the scenario #19, we first set prices defined by scenario #19 for all steps from step #1 till the step which serial number, 19 is defined as the minimum between the number correspond to the current price scenario, i.e. 19 and the last step with feasible solution, i.e. 20, 1040. Then a joint optimization is triggered. If a feasible solution is found, the price for step #19 is fixed by using the price scenario #19, and then the matching for scenario #19 is complete, and move to next scenario for matching offering steps for scenario # 18, 1050. Otherwise, gradually reducing the total number of steps to set with scenario #19 by removing the steps with maximal serial number to set with current scenario #19 one step one time, 1060, until a feasible solution is found and we are able to move to next lower-level scenario #18, 1070. Or, no feasible solution is found, then last feasible solution is the final solution.

The same procedure described for scenario #19 repeats for all remaining price scenarios by lowering price scenario one level down once a time until no better or feasible solution can be found. The last feasible solution is the final one in which each step is matching with a price scenario that given by above procedure.

The solution algorithm for joint scheduling and bidding optimization is described in Algorithm-1.

Algorithm 1: Algorithm for solving joint scheduling and bidding optimization

1. Initialize price scenario numbers for step s at current and last iteration, $s_s^{cur}$ and $s_s^{lst}$ with S, and set the step number for last feasible solution, $S^{lst}$ as S.
2. for $s^{price}$=S, ..., 1 (price scenario iterator)
3. for $s^{step}$=min$\{s^{price}, S^{lst}\}$, ..., 1 (offering step iterator)
4. Set $s_s^{cur}=s^{price}$, s=$\{1, 2, ..., s^{step}\}$;
5. Set $Price_{s,t}=MCP_{s_s^{cur},t}$, s=$\{1, ..., S\}$, t=$\{1, ..., T\}$;

6. Set $\overline{Prob}_s = Prob_{s_s^{cur}}^{MCP}$, s = $\{1, 2, ..., S\}$;

7. Update $Prob_s = \dfrac{\overline{Prob}_s}{\sum_{S=1}^{S} \overline{Prob}_s}$, s = $\{1, 2, ..., S\}$.

8. Solve joint optimization problem without constraints of (11)-(13).
9. If a feasible solution is obtained, save the step's price scenarios at current iteration as ones at last iteration, i.e. $s_s^{lst}=s_s^{cur}$, s=$\{1, 2, ..., S\}$, set last feasible solution step $S^{lst}=s^{step}$, and then go to step 2 for next iteration on $s^{price}$; Otherwise, go to step 10.
10. Restore step's price scenarios at current iteration to ones at last iteration, i.e. $s_s^{cur}=s_s^{lst}$, s=$\{1, 2, ..., S\}$, and then go to step 3 for next iteration on $S^{step}$.
11. End for $ss^{teP}$
12. If $S^{price}$ is less than $S^{lst}$, stop. The latest feasible solution is the final solution.
13. End for $s^{price}$
14. Output offering curves with bidding points determined above.

Algorithm 1 using two vectors, $s_s^{cur}$ and $s_s^{lst}$ to store the price scenarios for each step at two consecutive iterations, and one variable $S^{lst}$ to store the step with last feasible solution. Step 2 and step 16 are used to iterate the price scenario from the highest level, to the lowest level at an outer loop. Step 3 and step 10 are used to determine the steps matching with the price scenario chosen by the outer loop through iterating the offering steps from one corresponding to the chosen price scenario by outer loop, or step with last feasible solution, to the lowest step #1 at an inner loop.

Step 4 sets all possible steps that chosen by the inner loop with the current price scenario that chosen by outer loop, and prices for each scheduling interval are set accordingly as in Step 5. The probability of price scenario for each step is initially set at Step 6, and normalized in Step 7 to guarantee that the sum of probability for all steps are equal to one.

Step 9 triggers a joint scheduling and bidding optimization solution. If a feasible solution is found, the last feasible solution is updated and the current step's price scenarios are saved for preparing for next iteration on the outer loop. Step 10 handles the situation that a feasible solution for joint scheduling and bidding optimization cannot be found with respect to the chosen price scenario and currently chosen set of steps. This step restores the current price scenario setting as last saved ones, and the current step's price scenario as the ones of last iteration, and then return to Step 3 for a next iteration to adjust the possible matching offering steps.

Step 12 gives the abnormal termination condition for iterations at the outer loop. If the step number for the last feasible solution is less than the available price scenario number, then all steps are matched with corresponding price scenarios, and a set of offering curves can be generated using the latest solution as in Step 14.

Features

Some aspects of the present disclosure include that the submitted supply value information from the energy futures market includes previous cleared market prices associated with the energy futures market that is stored data in the memory, data received via the transceiver, or both.

Some aspects of the present disclosure include the computation of the offer amount for a time step is performed by predicting a mean value of MCVS and a standard deviation of MCVS for the time step. Using a machine learning model based on a stored data, a data received via the transceiver, or both. Wherein the machine learning model includes multiple-regression analysis model or an artificial neural network (ANN) model. Wherein some of the stored data and the received data include historical trading-related explanatory data and non-trading-related explanatory data per previous time periods over a previous similar time-window, and the predicted non-trading related explanatory data per time period over the time window.

Wherein trading related explanatory data include regional market clearing prices (MCPs), system market clearing power quantities (MCPQ), system total selling power quantities, and system total buying power quantities; Wherein non-trading related explanatory data include regional environmental data and inter-regional bi-directional power transfers and capacities. Wherein the machine learing model is trainned using MCPs for a set of historical time windows for trainning, and trading-related explanatory data and non-trading-related explanatory data for a set of time windows relevant to the set of historical time windows for training. Wherein the mean MCVS is estimated using the trained machine learning model using trading-related explanatory data over a set of historical time windows relevant to the time window, and non-trading related explanatory data for the time window; wherein the stardard deviations are estimated based the estimated mean MCVS and a statistics of mismatches between actual MCPs and the MCVSs estimated using the trained machine learning model over a set of histical time windows; wherein the historical time windows relevent to the time window include a previous time window, and a previous week same time window.

Some aspects of the present disclosure include the multiple factors for computing the offer amount for each time period include a set of MCVS scenarios that evenly distributed within three times standard deviations of the precited MCVS. Wherein associated distribution probability for the MCVS scenario is determined based on the deviation of the MCVS scenario with the predicted mean values of MCVS along with the predicted standard deviations of MCVS for the time period, and normalized to make probability sum as 1 over all MCVS scenarios.

Some aspects of the present disclosure include the decision variables include points of offer energy quantities and offer energy prices, the generation unit on/off statues, the generation unit start-up and shut-down states, and the generation unit output levels.

Some aspects of the present disclosure include the determination of the set of points used for constructing the energy supply curves for each time period in the time window is performed by formulating and solving a double-objective optimization problem to maximize the expected profit gain over all price scenarios for each time step in the time window, and the expected profit gain over most-risky price scenarios for each time step in the time window. While satisfying the non-decreasing offer quantity and price requirements among points per each time period, upward and downward ramping capacity constraints for required distance price scenario transition among consecutive time periods, and generator capacities, ramping rates, on/off times and durations constraints per each time period for each price scenario, wherein the price scenarios are arranged in ascending order on price.

Some aspects of the present disclosure include the total number of MCVS scenarios per each time period equals to a maximum allowed number of points for the energy supply curve given by the energy operator, wherein the time window includes a set of time periods with equal length.

Some aspects of the present disclosure include most risky price scenarios are determined as the set of price scenarios whose accumulated probabilities equals or are greater than a given confidence level, wherein the accumulated probability for a scenario is determined by accumulating the acceptance probability of price scenarios from lowest scenario to the said scenario.

Wherein the variations of scheduling for the on/off statuses of the generation unit over time periods between price scenarios are limited by the scheduling capability of the unit determined by the ramping capacities of the unit, wherein a same schedule for the on/off statuses over time periods is used for all scenarios for a generator with scenario invariant scheduling capability, wherein a different schedule for the on/off statuses over time periods may be for each scenario for a generator with scenario-based scheduling capability, wherein a common schedule for the on/off statuses over time periods is used for each of a scenario group for a generator with scenario group-based scheduling capability.

Wherein the expected profit gain is determined as sum of the product of offer power quantity and offer power price for each price scenario weighted by the normalized acceptance probability of the said price scenario. Wherein the normalized acceptance probability of the price scenario is determined by dividing the acceptance probability of the price scenario by the sum of the acceptance probabilities of all scenarios chosen according to expected profit gain calculation. Wherein the acceptance probability of the price scenario is determined based on the accumulation of the distribution probability of all price scenarios whose prices equal or are greater than the price of the said scenario.

Wherein the optimization problem is converted into a single-objective optimization problem by maximizing the overall objective satisfying degree of two objectives. Wherein the overall objective satisfying degree is determined as the minimal of the objective satisfying degrees for each objective. Wherein the objective satisfying degree of each objective is determined based on a desired maximum value, and a tolerable minimum value for the objective. Wherein the gradual decreasing price staircase approach is performed by using an outer loop to iterate price scenario in a descending order from a highest price to a lowest price chosen from the set of predicted MCVSs, and an inner loop to iterate offering step level in descending order from the highest level defined as the minimum of the level corresponding to the current price scenario and a feasible highest step for last price scenario. Wherein the feasible highest step is found when a corresponding feasible solution for the single-objective optimization problem can be found when the prices for all steps from the lowest step to the highest step are set with the prices of current price scenario. Wherein a nonlinear function used for determining the profit gain for each time period by multiplying the offering prices with the offering quantities is converted into a linear function by setting the offer price for the time step using one of the determined MCVSs for the time period.

Some aspects of the present disclosure include the energy futures market is a day-ahead energy market.

Some aspects of the present disclosure include the system is a control scheme that improves electrical power grid management and generation unit control using distributed transactive computing hardware associated with the generation unit.

Some aspects of the present disclosure include a transceiver is connected to the hardware processor, that sends and received data to the energy operator computer, such that the transceiver submits the multiple offer amount scenarios along with corresponding values representative of quantities of power to the energy operator computer, and receives the submitted supply value from the energy operator computer.

Some aspects of the present disclosure include the comparing of the submitted supply value to the submitted offer amount for the time step by the hardware processor is performed to determine the corresponding power quantities to be supplied by the generation unit and the values for scheduling decision variables, and based upon the comparison, a signal is generated by the hardware processor for the transceiver to send the signal to a controller of the generation unit, to activate or deactivate the generation unit.

Figure 11:
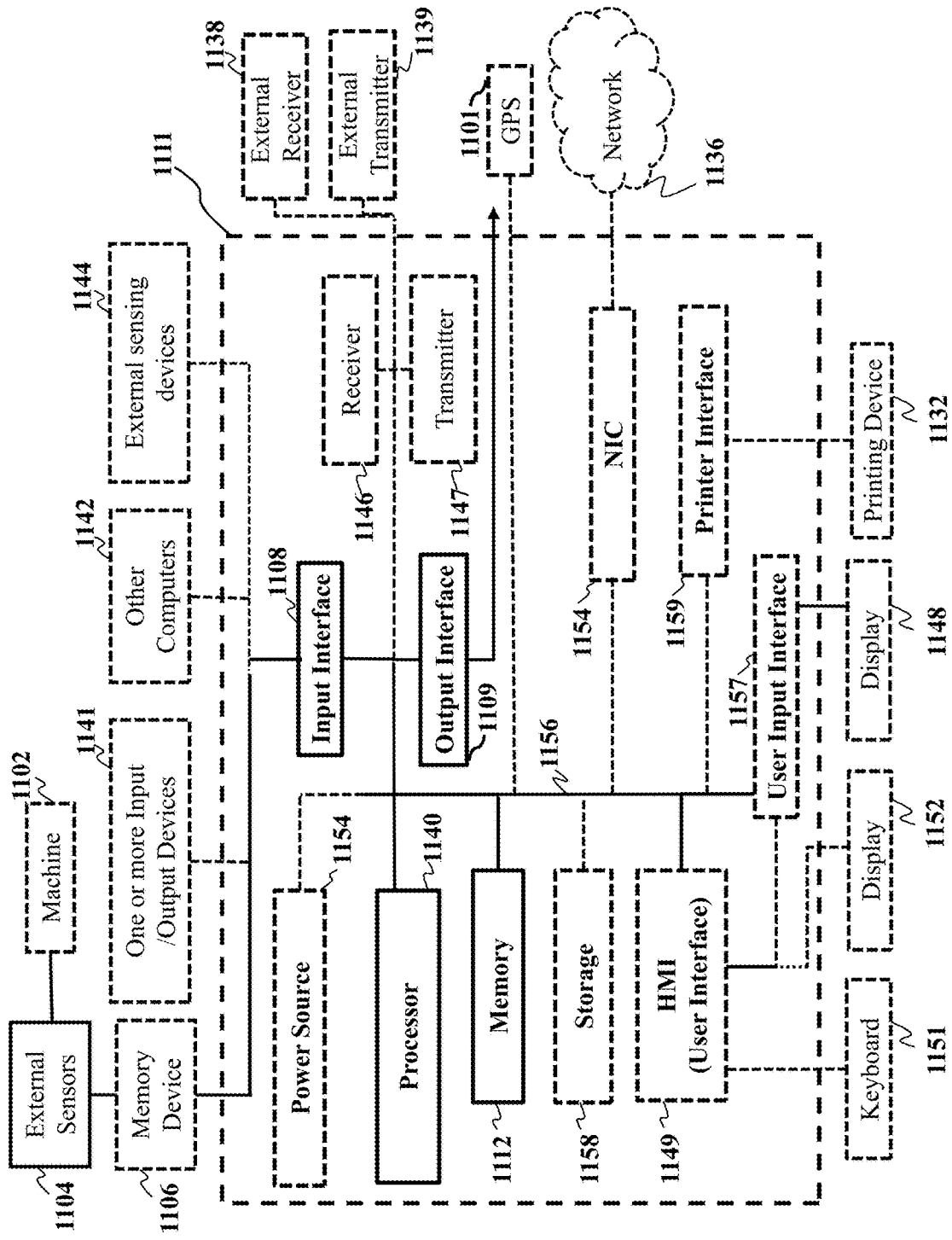
FIG. 11 is a block diagram of illustrating the method of FIG. 1A, that can be implemented using an alternate power plant controller, according to embodiments of the present disclosure.

FIG. 11 is a block diagram of illustrating the method of FIG. 1A, that can be implemented using an alternate power plant controller, according to embodiments of the present disclosure. The controller 1111 includes a processor 1140, computer readable memory 1112, storage 1158 and user interface 1149 with display 1152 and keyboard 1151, which are connected through bus 1156. For example, the user interface 1149 in communication with the processor 1140 and the computer readable memory 1112, acquires and stores the data in the computer readable memory 1112 upon receiving an input from a surface, keyboard surface, of the user interface 1157 by a user.

Contemplated is that the memory 1112 can store instructions that are executable by the processor, historical data, and any data to that can be utilized by the methods and systems of the present disclosure. The processor 1140 can be a single core processor, a multi-core processor, a computing cluster, or any number of other configurations. The processor 1140 can be connected through a bus 1156 to one or more input and output devices. The memory 1112 can include random access memory (RAM), read only memory (ROM), flash memory, or any other suitable memory systems.

Still referring to FIG. 11, a storage device 1158 can be adapted to store supplementary data and/or software modules used by the processor. For example, the storage device 1158 can store historical data and other related data as mentioned above regarding the present disclosure. Additionally, or alternatively, the storage device 1158 can store historical data similar to data as mentioned above regarding the present disclosure. The storage device 1158 can include a hard drive, an optical drive, a thumb-drive, an array of drives, or any combinations thereof.

The system can be linked through the bus 1156 optionally to a display interface (not shown) adapted to connect the system to a display device (not shown), wherein the display device can include a computer monitor, camera, television, projector, or mobile device, among others.

The controller 1111 can include a power source 1154, depending upon the application the power source 1154 may be optionally located outside of the controller 1111. Linked through bus 1156 can be a user input interface 1157 adapted to connect to a display device 1148, wherein the display device 1148 can include a computer monitor, camera, television, projector, or mobile device, among others. A printer interface 1159 can also be connected through bus 1156 and adapted to connect to a printing device 1132, wherein the printing device 1132 can include a liquid inkjet printer, solid ink printer, large-scale commercial printer, thermal printer, UV printer, or dye-sublimation printer, among others. A network interface controller (NIC) 1154 is adapted to connect through the bus 1156 to a network 1136, wherein data or other data, among other things, can be rendered on a third party display device, third party imaging device, and/or third party printing device outside of the controller 1111. Further, the bus 1156 can be connected to a *Global Positioning System* (GPS) device 1101 or a similar related type device.

Still referring to FIG. 11, the data or other data, among other things, can be transmitted over a communication channel of the network 1136, and/or stored within the storage system 1158 for storage and/or further processing. Further, the data or other data may be received wirelessly or hard wired from a receiver 1146 (or external receiver 1138) or transmitted via a transmitter 1147 (or external transmitter 1139) wirelessly or hard wired, the receiver 1146 and transmitter 1147 are both connected through the bus 1156. The controller 1111 may be connected via an input interface 1108 to external sensing devices 1144 and external input/output devices 1141. The controller 1111 may be connected to other external computers 1142, memory device 1106, external sensors 1104 and machine 1102. An output interface 1109 may be used to output the processed data from the processor 1140.

Embodiments

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Further, embodiments of the present disclosure and the functional operations described in this specification can be implemented in digital electronic circuitry, in tangibly-embodied computer software or firmware, in computer hardware, including the structures disclosed in this specification and their structural equivalents, or in combinations of one or more of them. Further some embodiments of the present disclosure can be implemented as one or more computer programs, i.e., one or more modules of computer program instructions encoded on a tangible non transitory program carrier for execution by, or to control the operation of, data processing apparatus. Further still, program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

According to embodiments of the present disclosure the term "data processing apparatus" can encompass all kinds of apparatus, devices, and machines for processing data, including by way of example a programmable processor, a computer, or multiple processors or computers.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network. Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

What is claimed is:

1. A system to control activation of a generation unit, comprising: a memory and a hardware processor, the hardware processor is configured to compute an offer amount representative of a value at which power is available to be supplied by a generation unit for a current or the each subsequent upcoming time period in a time window, such that the computation of the offer amount is based on multiple factors for each time period, wherein some of the multiple factors include submitted supply value information from an energy futures market and a predicted market clearing value submission (MCVS) and an associated distribution probability, and wherein a total number of MCVS scenarios per each time period equals to a maximum allowed number of points for an energy supply curve given by an energy operator, such that the time window includes a set of time periods with equal length; construct the energy supply curve using a set of points for each time period in the time window, to obtain associated amounts of power to supply with corresponding prices per each time period, wherein the set of points per each time period are calculated from a determined corresponding scheduling decision variable associated with the generation unit for per each time period in the time window; use a gradual decreasing price staircase approach to iteratively determine multiple offer amount scenarios during the current or the each subsequent upcoming time period; submit the multiple offer amount scenarios along with corresponding values representative of quantities of power that are available to be supplied by the generation unit during the current or the each subsequent upcoming time period to an energy operator computer that controls a market-based resource allocation system; receive from the energy operator computer a submitted supply value for the current or upcoming time period, the submitted supply value being based at least in part on the submitted multiple offer amount scenarios; compare the submitted supply value to the submitted offer amount scenarios; and activate or deactivate the generation unit based on the comparison.

2. The system of claim 1, wherein a mean MCVS is estimated using a trained machine learning model using trading-related explanatory data over a set of historical time windows relevant to the time window, and non-trading related explanatory data for the time window, and standard deviations are estimated based on the estimated mean MCVS and a statistics of mismatches between actual market clearing prices (MCPs) and the market clearing value submissions (MCVSs) estimated using the trained machine learning model over the set of historical time windows, such that the historical time windows relevant to the time window include a previous time window, and a previous week same time window, and wherein the machine learning model is trained using historical market clearing prices (MCPs) for a set of historical time windows for training, and trading-related explanatory data and non-trading-related explanatory data for a set of time windows relevant to the set of historical time windows for training.

3. The system of claim 1, wherein historical trading related explanatory data includes regional market clearing prices (MCPs), system market clearing power quantities (MCPQs), system total selling power quantities, and system total buying power quantities, and a non-trading related explanatory data include regional environmental data and inter-regional bi-directional power transfers and capacities.

4. The system of claim 1, wherein the multiple factors for computing the offer amount for each time period include a set of MCVS scenarios that are evenly distributed within three times standard deviations of the predicted MCVS, such that an associated distribution probability for the MCVS scenario is determined based on the deviation of the MCVS scenario with predicted mean values of MCVS along with predicted standard deviations of MCVS for the time period, and normalized to make the associated distribution probability sum as 1 over all MCVS scenarios.

5. The system of claim 1, wherein a determination of the set of points used for constructing the energy supply curves for each tim e period in the time window is performed by formulating and solving a double-objective optimization problem to maximize an expected profit gain over all price scenarios for each time period in the time window for market clearing prices (MCPs), and the expected profit gain over most risky price scenarios for each time period in the time window for the MCPs, while satisfying a non-decreasing offer quantity and price requirements among points per each time period, upward and downward ramping capacity constraints for required distance price scenario transition among consecutive time periods, and generator capacities, ramping rates, on/off times and durations constraints per each time period for each price scenario, wherein the price scenarios are arranged in ascending order on price.

6. The system of claim 5, wherein most risky price scenarios are determined as a set of price scenarios whose accumulated probabilities equals or are greater than a given confidence level, wherein the accumulated probabilities for a scenario is determined by accumulating the acceptance probability of price scenarios from lowest scenario to the said scenario.

7. The system of claim 5, wherein variations of scheduling for on/off statuses of the generation unit over time periods between price scenarios are limited by a scheduling capability of the unit determined by ramping capacities of the unit, wherein a same schedule for the on/off statuses over time periods is used for all scenarios for the generator with scenario invariant scheduling capability, wherein a different schedule for the on/off statuses over time periods may be used for each scenario for a generator with scenario-based scheduling capability, wherein a common schedule for the on/off statuses over time periods is used for each of a scenario group for the generator with scenario group-based scheduling capability.

8. The system of claim 5, wherein the expected profit gain is determined as a sum of a product of offer power quantity and offer power price for each price scenario weighted by a normalized acceptance probability of the said price scenario, wherein the normalized acceptance probability of a price scenario is determined by dividing an acceptance probability of the price scenario by a sum of the acceptance probabilities of all scenarios chosen according to the expected profit gain calculation.

9. The system of claim 8, wherein the acceptance probability of the price scenario is determined based on an accumulation of the distribution probability of all price scenarios whose prices equal or are greater than the price of the said scenario.

10. The system of claim 5, wherein the optimization problem is converted into a single-objective optimization problem by maximizing an overall objective satisfying degree of two objectives, wherein the overall objective satisfying degree is determined as a minimal of an objective satisfying degrees for each objective, wherein the objective satisfying degree of each objective is determined based on a desired maximum value, and a tolerable minimum value for the objective.

11. The system of claim 10, wherein the gradual decreasing price staircase approach is performed by using an outer loop to iterate price scenario in a descending order from a highest price to a lowest price chosen from a set of predicted MCVSs, and an inner loop to iterate an offering step level in descending order from an highest level defined as a minimum of the level corresponding to a current price scenario and a feasible highest step for last price scenario; wherein the feasible highest step is found when a corresponding feasible solution for the single-objective optimization problem can be found when prices for all steps from a lowest step to a highest step are set with prices of the current price scenarios.

12. The system of claim 11, wherein a nonlinear function is used for determining a profit gain for each time period by multiplying offering prices with offering quantities and is converted into a linear function by setting an offer price for a time step using one of a determined MCVSs for the time period.

13. The system of claim 1, wherein the decision variables include points of offer energy quantities and offer energy prices, a generation unit on/off statuses, a generation unit start-up and shut-down states, and a generation unit output levels.

14. The system of claim 1, wherein the submitted supply value information includes previously cleared market prices associated with the energy futures market that is stored data in the memory, data received via a transceiver, or both.

15. The system of claim 1, wherein a transceiver is connected to the hardware processor, that receives and sends data to the energy operator computer, such that the transceiver submits the multiple offer amount scenarios along with corresponding values representative of quantities of power to the energy operator computer, and receives the submitted supply value from the energy operator computer.

16. The system of claim 13, wherein the comparing of the submitted supply value to the submitted offer amount for a time step by the hardware processor is performed to determine the corresponding power quantities to be supplied by the generation unit and the supply values for scheduling decision variables, and based upon the comparison, a signal is generated by the hardware processor for the transceiver to send the signal to a controller of the generation unit, to activate or deactivate the generation unit.

17. A non-transitory computer readable storage medium embodied thereon a program executable by a processor for performing a method, the method comprising: computing an offer amount representative of a value at which power is available to be supplied by a generation unit for a current or each subsequent upcoming time period in a time window, such that the computation of the offer amount is based on multiple factors for each time period, wherein some of the multiple factors include submitted supply value information from an energy futures market and a predicted market clearing value submission (MCVS) and an associated distribution probability, wherein the submitted supply value information includes previously cleared market prices associated with the energy futures market that is stored data in memory, data received via a transceiver, or both, and wherein the energy futures market is a day-ahead energy market, wherein the computation of the offer amount for a time period is performed by predicting a mean value of MCVS and a standard deviation of MCVS for the time period, using a machine learning model based on the stored data, data received via the transceiver, or both, such that the machine learning model includes a multiple-regression analysis model or an artificial neural network (ANN) model, and wherein some of the stored data and the received data include historical trading —related explanatory data and non-trading-related explanatory data per previous time periods over a previous similar time-window, and predicted non-trading related explanatory data per time period over the time window; constructing energy supply curves using a set of points for each time period in the time window, to obtain associated amounts of power to supply with corresponding prices per each time period, wherein the set of points per each time period are calculated from a determined corresponding scheduling decision variable associated with the generation unit for per each time period in the time window; using a gradual decreasing price staircase approach to iteratively determine multiple offer amount scenarios during the current or the subsequent upcoming time period; submitting the multiple offer amount scenarios along with corresponding values representative of quantities of power that are available to be supplied by the generation unit during the current or the subsequent upcoming time period to an energy operator computer that controls a market-based resource allocation system; receiving from the energy operator computer a submitted supply value for the current or upcoming time period, the submitted supply value being based at least in part on the submitted multiple offer amount scenarios; comparing the submitted supply value to the submitted offer amount scenarios; and activating or deactivating the generation unit based on the comparison, wherein at least some steps of the method are performed by a processor connected to the memory.

18. A method to control activation of a generation unit, comprising: computing an offer amount representative of a value at which power is available to be supplied by a generation unit for a current or each subsequent upcoming time period in a time window, such that the computation of the offer amount is based on multiple factors for each time period, wherein some of the multiple factors include submitted supply value information from an energy futures market and a predicted market clearing value submission (MCVS) and an associated distribution probability, and wherein a total number of MCVS scenarios per each time period equals to a maximum allowed number of points for an energy supply curve given by an energy operator, such that the time window includes a set of time periods with equal length; constructing the energy supply curve using a set of points for each time period in the time window, to obtain associated amounts of power to supply with corresponding prices per each time period, wherein the set of points per each time period are calculated from a determined corresponding scheduling decision variables associated with the generation unit for per each time period in the time window; using a gradual decreasing price staircase approach to iteratively determine multiple offer amount scenarios during the current or the each subsequent upcoming time period; submitting the multiple offer amount scenarios along with corresponding values representative of quantities of power that are available to be supplied by the generation unit during the current or the each subsequent upcoming time period to an energy operator computer that controls a market-based resource allocation system; receiving from the energy operator computer a submitted supply value for the current or upcoming time period, the submitted supply value being based at least in part on the submitted multiple offer amount scenarios; comparing the submitted supply value to the submitted offer amount scenarios; and activating or deactivating the generation unit based on the comparison, wherein at least some steps of the method are performed by a processor connected to memory.

\* \* \* \* \*